(12) United States Patent
Schreiber et al.

(10) Patent No.: US 6,438,747 B1
(45) Date of Patent: Aug. 20, 2002

(54) PROGRAMMATIC ITERATION SCHEDULING FOR PARALLEL PROCESSORS

(75) Inventors: Robert S. Schreiber, Palo Alto; Bantwal Ramakrishna Rau, Los Altos, both of CA (US); Alain Darte, Lyons (FR)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/378,393

(22) Filed: Aug. 20, 1999

(51) Int. Cl.[7] .................................................. G06F 9/45
(52) U.S. Cl. ....................................................... 717/160
(58) Field of Search .............................. 717/9, 2, 6, 5, 717/149, 150–262; 712/241; 709/102, 103, 104, 105, 106, 107, 108

(56) References Cited

U.S. PATENT DOCUMENTS

| | | | | | |
|---|---|---|---|---|---|
| 5,230,053 A | * | 7/1993 | Zaiki | ............................. | 717/6 |
| 5,442,790 A | * | 8/1995 | Nosenchuck | .................... | 717/7 |
| 5,579,494 A | * | 11/1996 | Zaiki | ............................. | 717/6 |
| 5,787,272 A | * | 7/1998 | Gupta et al. | ................. | 709/400 |
| 5,802,375 A | * | 9/1998 | Ngo et al. | ........................ | 717/9 |
| 5,832,272 A | * | 11/1998 | Kalantery | ........................ | 717/6 |
| 5,852,734 A | * | 12/1998 | Komatsu et al. | ................. | 717/7 |
| 5,890,134 A | * | 3/1999 | Fox | ................................ | 717/9 |
| 6,016,399 A | * | 1/2000 | Chang | ............................. | 717/9 |
| 6,041,181 A | * | 3/2000 | Ju et al. | .......................... | 717/9 |
| 6,058,266 A | * | 5/2000 | Megiddo et al. | ................. | 717/9 |
| 6,059,841 A | * | 5/2000 | Caracuzzo | ........................ | 717/9 |
| 6,070,011 A | * | 5/2000 | Liu et al. | ........................ | 717/9 |
| 6,226,776 B1 | | 5/2001 | Panchul | ........................... | 716/3 |

OTHER PUBLICATIONS

Darte et al., "Partitioning for Array Processors," Tech. Rep. 90–23, LIP, ENS Lyon, 1990.
A. Darte, "Regular Partitioning for Synthesizing Fixed–Size Systolic Arrays," Integration, the VLSI Journal, vol. 12, 1991, pp. 293–304.
X. Chen and G. M. Megson, "A General Methodology of Partitioning and Mapping for Given Regular Arrays," IEEE Transactions on Parallel and Distributed Systems, vol. 6, No. 10, 1995, pp. 1100–1107.
Rainer Leupers, Peter Marwedel, "Retargetable Generation of Code Selectors from HDL Processor Models," IEEE, 1997, pp. 140–144.

(List continued on next page.)

Primary Examiner—Gregory Morse
Assistant Examiner—Wei Zhen

(57) ABSTRACT

A parallel compiler maps iterations of a nested loop to processor elements in a parallel array and schedules a start time for each iteration such that the processor elements are fully utilized without being overloaded. The compiler employs an efficient and direct method for generating a set of iteration schedules that satisfy the following constraints: no more than one iteration is in initiated per processor element in a specified initiation interval, and a new iteration begins on each processor element nearly every initiation interval. Since the iteration scheduling method efficiently generates a set of schedules, the compiler can select an iteration schedule that is optimized based on other criteria, such as memory bandwidth, local memory size of each processor element, estimated hardware cost of each processor element, etc. The iteration scheduling method is useful for compilers where the underlying architecture is fixed, as well as for an automated processor array synthesis system where the nested loop is converted into a set of parallel processes for synthesis into a parallel processor array.

18 Claims, 8 Drawing Sheets

OTHER PUBLICATIONS

George Hadjiyiannis, Silvina Hanono, Srinivas Devadas, "ISDL: An Instruction Set Description Language for Retargetability," ACM, 1997, pp. 299–302.

Gyllenhaal et al., "HMDES Version 2.0 Specification," Hewlett Packard Laboratories Technical Report Impact–96–3, (Published before Aug. 20, 1999).

Hadiyiannis et al., "A Methodology for Accurate Performance Evaluation in Architecture Exploration." (Published before Aug. 20, 1999).

Hoogerbrugge et al., "Automatic Synthesis of Transport Triggered Processors." (Published before Aug. 20 1999).

Corporaal et al., "Move: A Framework for High–Performance Processor Design," ACM, 1991, pp. 692–701.

Corporaal et al., "Cosynthesis with the Move Framework." (Published before Aug. 20 1999).

Lanneer et al, "Chapter 5—Chess: Retargetable Code Generation for Embedded DSP Processors," Code Generation for Embedded Processors, Kluwer Academic Publications, pp. 85–102. (Published before Aug. 20 1999).

Fauth, "Chapter 8—Beyond Tool–Specific Machine Descriptions," Code Generation for Embedded Processors, Kluwer Academic Publications, pp. 138–152.

Quinton et al., *Systolic Algorithms & Architectures*, Prentice Hall, 1991, pp. 283–339.

Park et al., "Shewa: A Software Package for Synthesis of Pipelines from Behavioral Specifications," IEEE, Mar. 1988, vol. 7, No. 3, pp. 356–370.

Megson et al., "A Synthesis Method of LSGP Partitioning of Given–Shape Regular Arrays," IEEE, 1995, pp. 234–238.

Chen et al., "A General Methodology of Partitioning and Mapping for Given Regular Arrays," *IEEE Transactions on Parallel and Distributed Systems*, vol. 6, No. 10, 1995, pp. 1100–1107.

Bagg et al., "Parallelizing Applications into Silicon," MIT- (Published before Aug. 20 1999).

Rim et al., "Optimal and Heuristic Algorithms for Solving the Binding Problem," Madison, WI, Sep. 10, 1993.

Weinhardt et al., "Memory Access Optimization and RAM Inference for Pipeline Vectorization," Proceedings of the $9^{th}$ International Workshop, FPL '99, pp. 61–70.

Shackleford et al., "Satsuki: An Integrated Processor Synthesis and Compiler Generation System," IEICE Special Issue on Synthesis and Verification of Hardware Design, 10–96.

Devadas et al., "Algorithms for Hardware Allocation in Data Path Synthesis," IEEE, Jul. 1989, vol. 8, No. 7, pp. 768–781.

Cloutier et al., "The Combination of Scheduling, Allocation, and Mapping in a Single Algorithm," $27^{th}$ ACM/IEEE Design Automation Conference, 1990, pp. 71–76.

Wilson et al., "An ILP Solution for Simultaneous Scheduling, Allocation, and Binding in Multiple Block Synthesis," IEEE, 1994, pp. 581–586.

Wilson et al., "An ILP Solution for Optimum Scheduling, Module and Register Allocation, and Operation Binding in Datapath Synthesis," OPA, 1995, pp. 21–36.

Paulin et al., "Force–Directed Scheduling for the Behavorial Synthesis of ASIC's," IEEE, Jun. 1989, vol. 8, No. 6, pp. 661–679.

Chang et al., "Using Integer Linear Programming for Instruction Scheduling and Register Allocation in Multi–Issue Processors," Computers Math. Applic., vol. 34, No. 9, 1997, pp. 1–14.

Aditya et al., "Elcor's Machine Description System: Version 3.0," HPL–98–128, Oct. 1998, pp. 1–75.

Rau et al., "Machine–Description Driven Compilers for EPIC Processors," HP Laboratories Technical Report, HPL–98–40, Sep. 1998, pp. 1–82.

Kathail et al.,"HPL PlayDoh Architecture Specification: Version 1.0," HP Laboratories Technical Report, HPL–93–80, Feb. 1994, pp. 1–48.

Calinescu. A BSP Approach to the Scheduling of Tightly–Nested Loops. IEEE. 1997. pp. 549–553.*

Leonardi et al. Nested Loops Optimization for Multiprocessor Architecture Design. IEEE. 1998. pp. 415–418.*

Yang et al. On Symbolic Scheduling and Parallel Complexity of Loops. IEEE. 1995. pp. 360–367.*

IBM Technical Disclosure Bulletin. Automatic Parallelization of Loops in Sequential Code. Jul., 1987. pp. 731–735.*

* cited by examiner

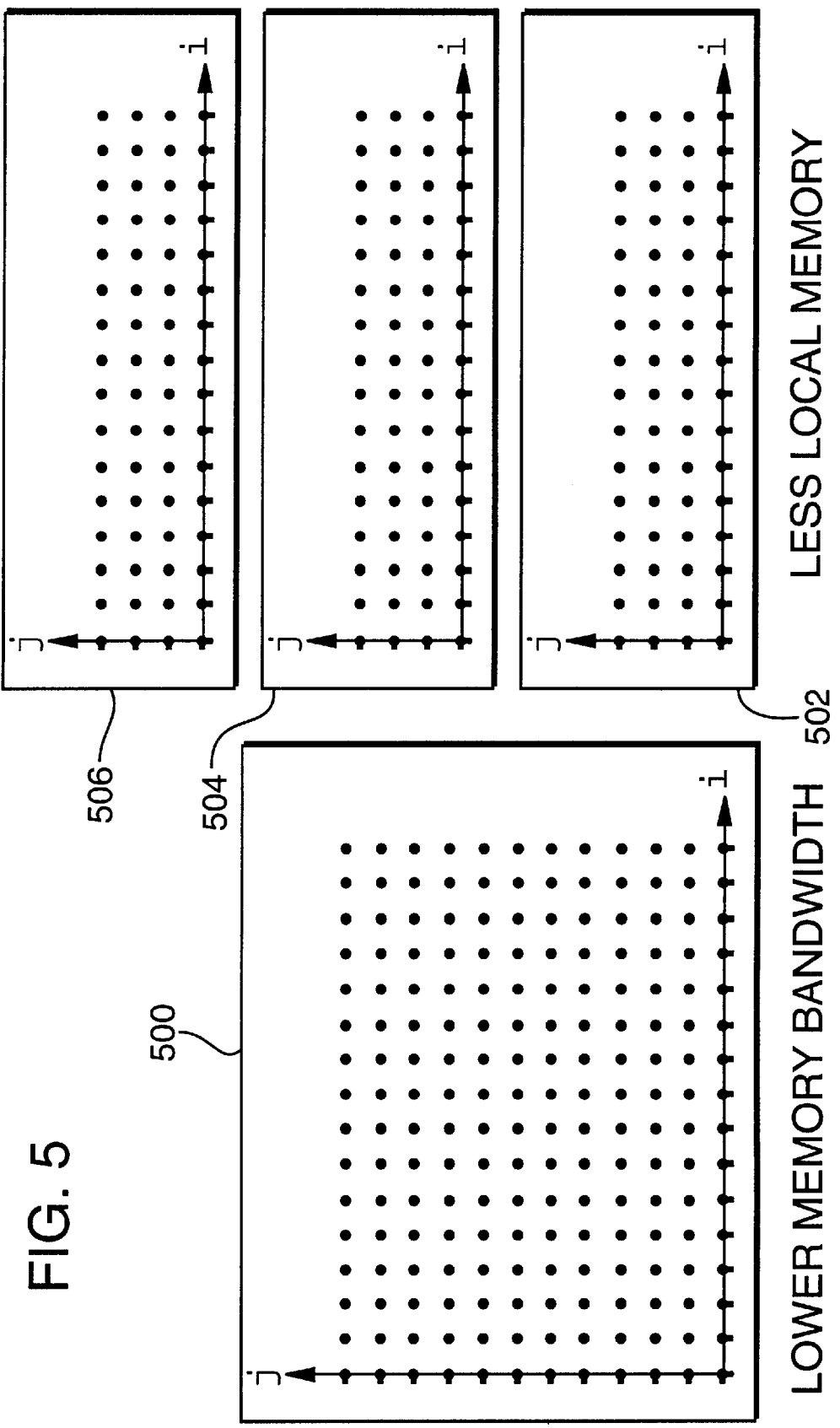

PROGRAMMATIC ITERATION SCHEDULING FOR PARALLEL PROCESSORS

This patent application is related to the following co-pending U.S. patent applications, commonly assigned and filed concurrently with this application:

U.S. patent application Ser. No. 09/378,298, entitled, "PROGRAMMATIC SYNTHESIS OF PROCESSOR ELEMENT ARRAYS" by Robert Schreiber, Bantwal Ramakrishna Rau, Shail Aditya Gupta, Vinod Kumar Kathail, and Sadun Anik.

U.S. patent application Ser. No. 09/378,397, entitled, "PROGRAMMATIC METHOD FOR REDUCING COST OF CONTROL IN PARALLEL PROCESSES" by Alain Darte and Robert Schreiber.

The above patent applications are hereby incorporated by reference.

TECHNICAL FIELD

The invention relates to parallel compiler technology, and specifically relates to iteration scheduling in which iterations in a nested loop are assigned and scheduled to execute on processor elements in a processor array.

BACKGROUND

Parallel compilers are used to transform a computer program into parallel code that runs on multi-processor systems. Traditionally, software developers design the compiler to optimize code for a fixed type of hardware. A principal objective of the compiler is to organize the computations in the program so that sets of computational tasks in the program may be executed concurrently across multiple processors in the specified hardware architecture.

Parallel compiler technology extends across a broad range of parallel computer architectures. For example, the multi-processor architecture may employ shared memory in which each processor element shares the same memory space, or distributed memory in which each processor has a local memory.

One area of compiler and computer architecture research focuses on optimizing the processing of computer programs with loop nests. Many computational tasks in software applications are expressed in the form of a multi-nested loop with two or more loops around a block of code called the loop body. The loop body contains a series of program statements, typically including operations on arrays whose elements are indexed by functions of loop indices. Such loop nests are often written in a high level programming language code in which the iterations are ordered sequentially. The processing of the loop nest may be optimized by converting the loop nest code to parallel processes that can be executed concurrently.

One way to optimize loop nest code is to transform the code into a parallel form for execution on an array of processor elements. The objective of this process is to assign iterations in the loop nest to processor elements and schedule a start time for each iteration. The process of assigning iterations to processors and scheduling iterations is a challenging task. Preferably, each iteration in the loop nest should be assigned a processor and a start time so that each processor is kept busy without being overloaded.

SUMMARY OF THE INVENTION

The invention provides an efficient method for programmatically scheduling iterations in a sequential loop nest for execution on a parallel array of processor elements. This scheduling method optimizes the use of each processor element without overloading it.

One aspect of the invention is a programmatic method for determining an iteration schedule for a parallel processor array such that the schedule satisfies an initiation interval constraint. The initiation interval is a measure of throughput that represents the shortest time interval between the initiation of successive iterations of the nested loop on a processor element. The scheduling method accepts a mapping of iterations of the nested loop to processor elements in a processor array. Based on this mapping and a specified initiation interval, the method programmatically determines a definition of iteration schedules. Each schedule satisfies the constraint that no more than one iteration is started on a processor element for each initiation interval. This method is implemented so as to keep each processor element as busy as possible. The schedules start a new iteration on each processor element nearly every initiation interval.

Another aspect of the invention is a programmatic method for determining a set of iteration schedules that satisfy a specified resource constraint and data flow dependencies among operations in a nested loop. The implementation of this method uses linear programming to guide the selection of iteration schedules such that the selected schedules are likely to satisfy data flow dependencies.

The invention provides an efficient and direct method for generating a set of schedules. This method enables the iteration scheduler to select one or more schedules that satisfy desired constraints. Since the scheduler quickly and efficiently provides iteration schedules, it can evaluate each schedule and select one or more that yield a parallel processor array with optimized performance or cost.

Further advantages and features of the invention will become apparent in the following detailed description and accompanying drawings.

BRIEF DESCRIPTION OF THE DRAWINGS

FIG. 5 is diagram illustrating the process of tiling an iteration space of a nested loop to partition the loop into sets of iterations initiated sequentially.

DETAILED DESCRIPTION

1.0 Introduction

Figure 1:
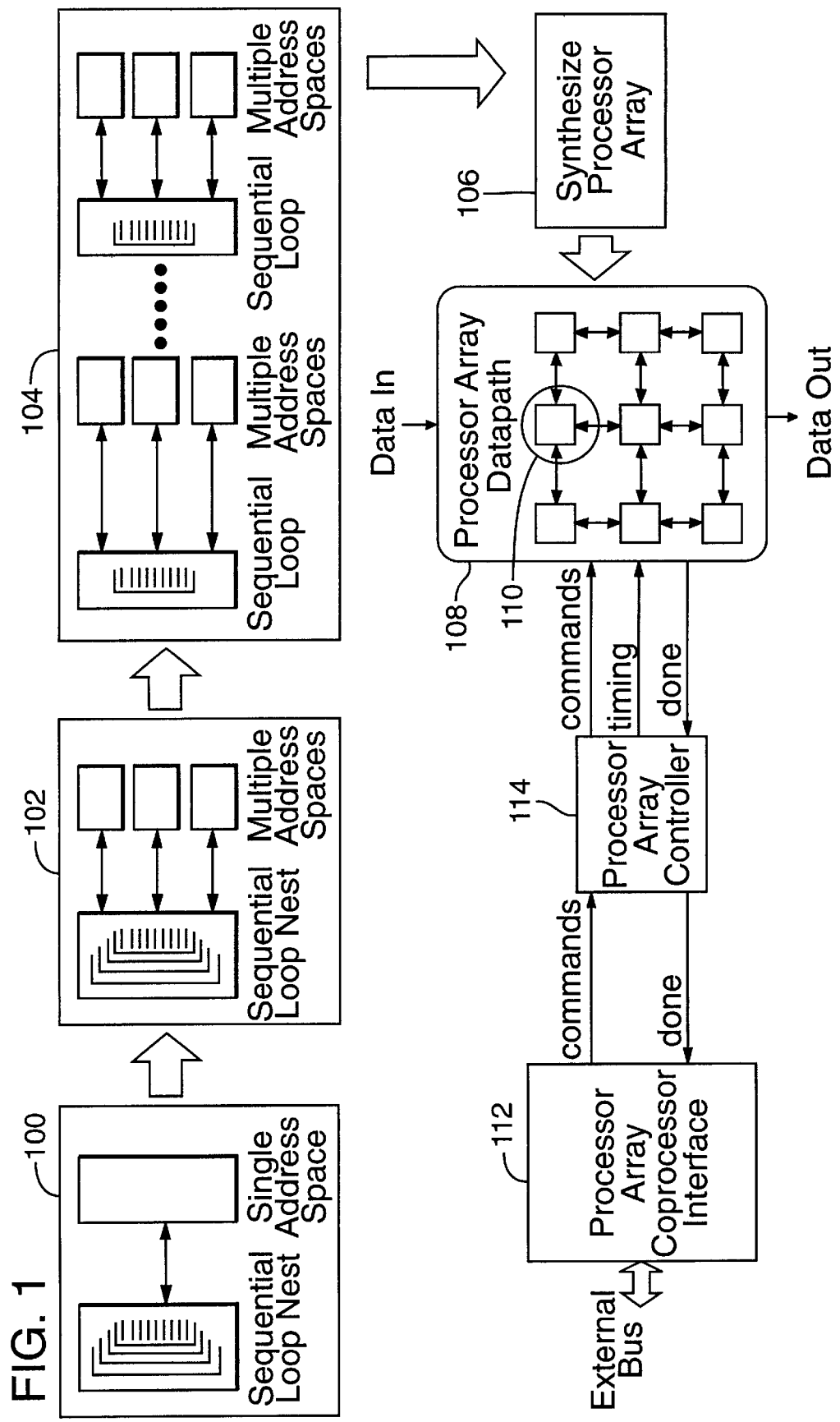
FIG. 1 is a conceptual overview of a design flow for transforming a nested loop and specified processor constraints into a set of parallel processes, each representing a single loop scheduled for execution on a processor element in a processor array.

The features summarized above are implemented in a parallel compiler for transforming a sequential loop nest into parallel code for execution on a parallel processor array. Before describing aspects of the compiler in more detail, we begin with a section of definitions of terms used throughout the document. We then provide an overview of the parallel compiler and its methods in Section 3. Finally, section 4 describes components of the parallel compiler in more detail.

2.0 Definitions

Nested Loop

A nested loop refers to a program in a high level language such as C, Java, Pascal etc. that has an n-deep loop nest, where n is an integer. For example, a three deep loop nest may take the form:

for i=i0, n1
  for j=j0, n2
    for k=k0, n3
      {loop body
      . . .
      }

Single Loop A single loop is a loop over a single dimension. For example, a single loop may take the form:

for t=tmin to tmax {
  Loop body
}

Time Loop

A single loop in which the iteration variable (t in the above example) refers to time.

Iteration Space

An iteration space refers to the coordinate space of an n-deep nested loop. This is a geometric view of an n-deep nested loop. Each point in the iteration space represents the computation corresponding to one iteration of the loop body and each dimension of the iteration space corresponds to a level of the loop nest. The coordinates of a point in the iteration space are given by the values of the iteration variables of the loop nest, i.e., i, j and k in the above example.

Processor Element

A processor element is a unit of processing resources that is intended to be replicated into an interconnected array of processor elements. Typically, it has a local storage (i.e. one or more local memories, local registers and local FIFOs) and includes one or more functional units for executing operations.

The processor element may be programmable or non-programmable. The primary difference between programmable and non-programmable processors lies in the way that their control logic is designed. There are the following two broad approaches for designing the control logic.

1. Finite state machine (FSM) based control: In this approach, there is no program stored in memory; the processor contains all of the control logic in the form of a finite state machine. The FSM can be implemented using hard-wired logic in which case the processor is non-programmable and can execute only one program. It can also be implemented using "reconfigurable" hardware such as FPGAs or certain types of PLAs. In this case, the processor can be re-configured to execute a different program.

2. Program counter based control: In this approach, the control is expressed in the form of a program consisting of a sequence of instructions stored in a program memory. The processor contains a program counter (PC) that contains the memory address of the next instruction to execute. In addition, the processor contains control logic that repeatedly performs the following sequence of actions:

A. Fetch instruction from the address in the PC.

B. Decode the instruction and distribute the control to the control points in the processor datapath.

C. Update the PC as follows. If the instruction just executed contains either an implicit or explicit branch and the branch was taken, then the new value of the PC is the branch target address specified in the instruction. In all other cases, the next value of the PC is the address of the next instruction in the program.

Virtual Processor

A virtual processor is one of the processors in a linear mapping of an n-deep nested loop to an (n−1) dimensional processor array. Each virtual processor may be thought of as a single process. Possibly one, but typically two or more virtual processors are assigned to a physical processor element in a processor array.

Physical Processor Element

A physical processor element refers to a processor element that is implemented in hardware.

Tile

A tile is a set of iterations generated by partitioning the iteration space of a nested loop into sets of iterations, where the sets are capable of being initiated and completed sequentially. Iterations within the tile may be executed in a parallel fashion.

Cluster

A cluster is a multi-dimensional, rectangular array of virtual processors that map to a single physical processor in a processor array. The clusters corresponding to physical processors are disjoint, and their union includes all of the virtual processors.

Expanded Virtual Register (EVR)

An infinite, linearly ordered set of virtual registers with a special operation, remap(), defined upon it. The elements of an EVR, v, can be addressed, read, and written as v[n], where n is any integer. (For convenience, v[0] may be referred to as merely v.) The effect of remap(v) is that whatever EVR element was accessible as v[n] prior to the remap operation will be accessible as v[n+1] after the remap operation.

EVRs are useful in an intermediate code representation for a compiler because they provide a convenient way to reference values from different iterations. In addition to representing a place to store values, EVRs also express dependences between operations, and in particular, can express dependences between operations in different iterations. While useful in scheduling operations, EVRs are not necessary because dependence information may be specified in other ways. For example, a compiler may perform loop unrolling and provide dependence distances for scheduling the operations.

Uniformized Array

An array of virtual registers such that there is a one-to-one mapping between the elements of the uniformized array and the iterations of a loop nest. Each element of the uniformized array is assigned a value exactly once by a particular operation of the corresponding iteration.

Dynamic Single Assignment (DSA)

A program representation in which the same virtual register, EVR element or uniformized array element is never assigned to more than once on any dynamic execution path. The static code may have multiple operations with the same virtual destination register as long as these operations are in mutually exclusive basic blocks or separated by (possibly implicit) remap operations. In this form, a program has no anti- or output dependences as a result of register usage.

Uniformization

Uniformization is a process of converting a loop body into a dynamic single assignment form. Each datum that is computed in one iteration and used on a subsequent iteration is assigned to an element of a uniformized array. This is done with two objectives in mind. One is to eliminate anti- and output dependences, thereby increasing the amount of parallelism present in the loop nest. The second objective of uniformization is to facilitate the reduction of the number of accesses (e.g., loads and stores) between local storage of a processor element and global memory. A variable converted in this process is referred to as a "uniformized variable."

Dependence Graph

A data structure that represents data flow dependences among operations in a program, such as the body of a loop. In a dependence graph, each operation is represented by a vertex in the graph and each dependence is represented by a directed edge to an operation from the operation upon which it is dependent. The distance of a dependence is the number of iterations separating the two operations involved. A dependence with a distance of 0 connects operations in the same iteration, a dependence from an operation in one iteration to an operation in the next one has a distance of 1, and so on. Each dependence edge is also decorated with an edge delay that specifies the minimum number of cycles necessary, between the initiation of the predecessor operation and the initiation of the successor operation, in order to satisfy the dependence.

A loop contains a recurrence if an operation in one iteration of the loop has a direct or indirect dependence upon the same operation from a previous iteration. The existence of a recurrence manifests itself as one or more elementary circuits in the dependence graph. (An elementary circuit in a graph is a path through the graph which starts and ends at the same vertex and which does not visit any vertex on the circuit more than once.) Necessarily, in the chain of dependences between an operation in one iteration and the same operation of a subsequent iteration, one or more dependences must be between operations that are in different iterations and have a distance greater than 0.

Predication

Predicated execution is an architectural feature that relates to the control flow in a computer program. In a computer architecture that supports predicates, each operation has an additional input that is used to guard the execution of the operation. If the predicate input is True, then the operation executes normally; otherwise the operation is "nullified", that is, has no effect on the processor state. Consider for example the operation:

$r=a+b$ if p

The operation has the p as the predicate input. If p is true, the operation computes a+b and writes the result into register r. On the other hand, if p is False, then the operation does not store a new value into r.

Predicated execution simplifies the generation of control hardware as it can be used to eliminate branches from programs. Branches imply a synchronized, global control of all of the functional units in that the functional units must be re-directed to perform new operations. Predicated execution, on the other hand, distributes control to each operation, and thus, the control can be implemented efficiently in hardware. Also, since predicate inputs are like other data inputs, code transformations that are used for data, such as arithmetic re-association to reduce height, can be used for predicates.

Throughput

Throughput is a measure of processor performance that specifies the number of times a certain computation, such as an iteration of the loop body, is performed per unit time.

Initiation Interval

A measure of processor performance, and the reciprocal of throughput, that specifies the number of processor cycles between the initiation of successive iterations of the loop body.

Memory Bandwidth

Memory bandwidth is a measure of performance that specifies the quantity of data per unit of time that that can be transferred to and from a memory device.

Minimum Initiation Interval (MII)

A lower bound on the initiation interval for the loop body when modulo scheduled on the processor element. The MII is equal to the larger of the RecMII and ResMII.

Resource-Constrained MII (ResMII)

A lower bound on the MII that is derived from the resource usage requirements of the loop body (e.g., the functional units required to execute the operations of the loop body).

Recurrence-Constrained MII (RecMII)

A lower bound on the MII that is derived from latency calculations around elementary circuits in the dependence graph for the loop body.

Macrocell Library (also referred to as Macrocell Database)

A macrocell library is a collection of hardware components specified in a hardware description language. It includes components such as gates, multiplexors (MUXes), registers, etc. It also includes higher level components such as ALUs, multipliers, register files, instruction sequencers, etc. Finally, it includes associated information used for synthesizing hardware components, such as a pointer to a synthesizable VHDL/Verilog code corresponding to the component, and information for extracting a machine description (MDES) from the functional unit components.

In the current implementation, the components reside in a macrocell database in the form of Architecture Intermediate Representation (AIR) stubs. During the design process, various synthesis program modules instantiate hardware components from the AIR stubs in the database. The MDES and the corresponding information in the functional unit component (called mini-MDES) are in the form of a database language called HMDES Version 2 that organizes information into a set of interrelated tables called sections containing rows of records called entries, each of which contain zero or more columns of property values called fields. For more information on this language, see John C. Gyllenhaal, Wen-mei W. Hwu, and Bantwal Ramakrishna Rau. HMDES version 2.0 specification. Technical Report IMPACT-96-3, University of Illinois at Urbana-Champaign, 1996.

For more information on MDES and the process of re-targeting a compiler based on the MDES of a target processor, see U.S. patent application Ser. No. 09/378,601, entitled PROGRAMMATIC SYNTHESIS OF A MACHINE DESCRIPTION FOR RETARGETING A COMPILER, by Shail Aditya Gupta, filed concurrently herewith, which is hereby incorporated by reference. See also: Bantwal Ramakrishna Rau, Vinod Kathail, and Shail Aditya. Machine-description driven compilers for EPIC processors. Technical Report HPL-98-40, Hewlett-Packard Laboratories, September 1998; and Shail Aditya Gupta, Vinod Kathail, and Bantwal Ramakrishna Rau. Elcor's Machine Description System: Version 3.0. Technical Report HPL-98-128, Hewlett-Packard Laboratories, October, 1998, which are hereby incorporated by reference.

3.0 Overview of the Parallel Compiler

FIG. 1 provides a conceptual overview of our parallel compiler. The compiler transforms the program code of a sequential loop nest from using a single address space (e.g., main memory) 100 to multiple address spaces (e.g., local memory, look up tables, FIFOs, ROM, and main memory) 102. The initial sequential code contains references to a global address space implemented in main memory of the computer. The transformed code includes parallel processes that access local storage of the processor array and that also occasionally reference the global address space (e.g., in main memory). The purpose of this stage in the design flow is to minimize the use of local storage for each processor element in the array while staying within the available main memory bandwidth.

The compiler transforms the sequential computation of the nested loop into a parallel computation 104. This stage applies various parallel compiler methods to map the nested loop code from its original iteration space to a time-processor space.

Additionally, the compiler maps the parallel computation to the specified number of processors. In the implementation detailed below, this mapping yields a synchronized parallel computation on an array of physical processor elements.

The compiler transforms the parallel computation assigned to each processor into a single, non-nested loop to yield a synchronized parallel program. At this stage, a single time loop is assigned to each physical processor element. The parallel compiler has transformed the loop nest program into a form that enables a hardware synthesis process 106 to convert this collection of single time loops to a hardware structure representing the physical processor array. The parallel compiler may also be designed to transform the loop nest to an existing processor array architecture.

FIG. 1 depicts a specific example of this processor array. In this example, the processor array comprises an array 108 of data path elements 110. Typically controlled by a general-purpose computer, the array receives control signals via a co-processor interface 112 and array controller 114. When it receives a command to start executing a loop nest and is initialized, the processor array executes the loop nest and returns a signal indicating it is done.

3.1 The Parallel Compiler

Figure 2:
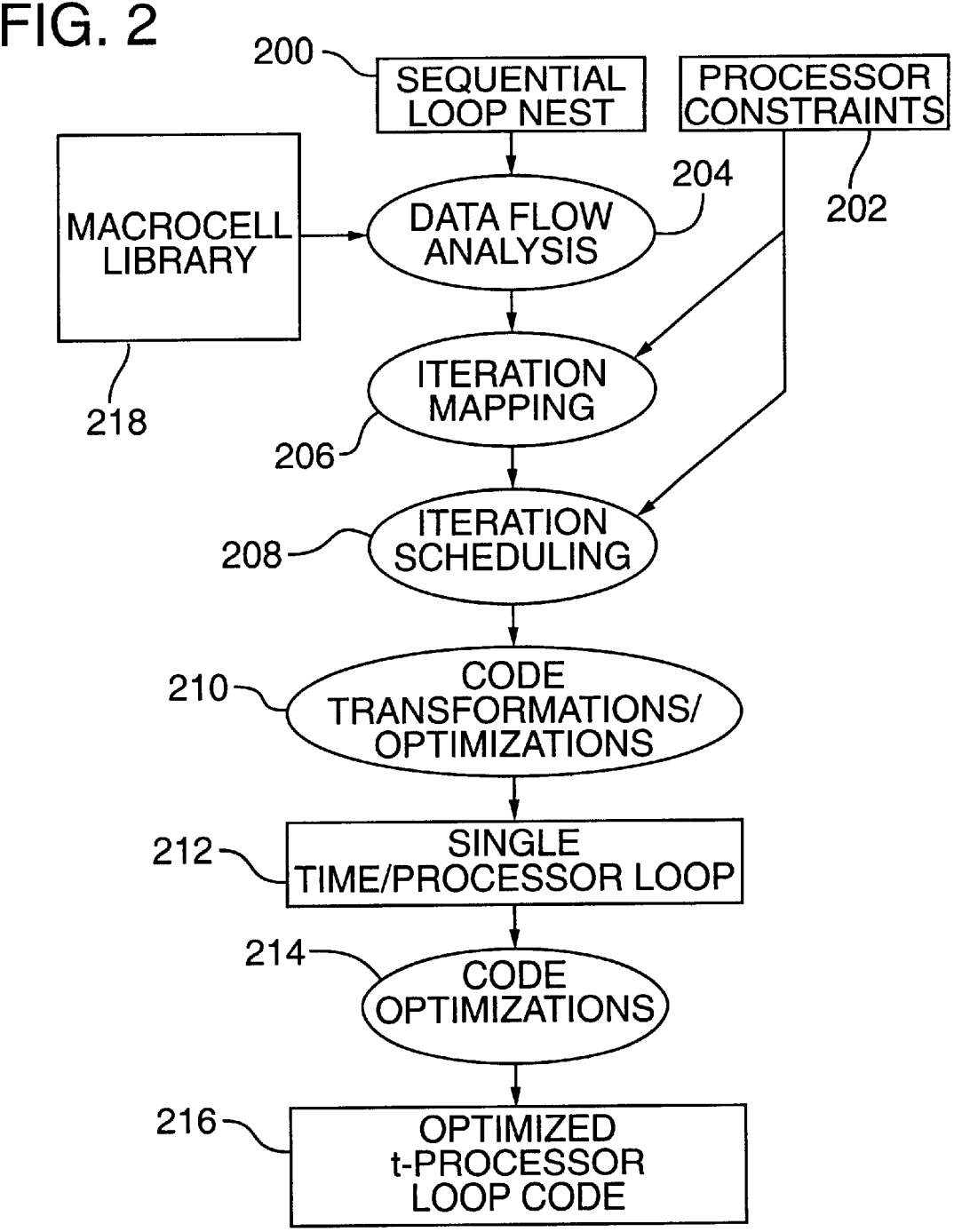
FIG. 2 is a flow diagram illustrating the operation of a system that implements the design flow of FIG. 1.

FIG. 2 is a flow diagram providing an overview of the parallel compiler. The parallel compiler performs data flow analysis to construct a data flow graph and extract variable references (204). Next, it maps iterations of the nested loop to processor elements based on a desired processor topology (206). Using this mapping, the processor constraints and data dependence constraints, the parallel compiler performs iteration scheduling to determine a start time for each iteration that avoids resource conflicts (208). Finally, the parallel compiler transforms the code from its initial iteration space to a time—processor space 210, 212. The output specifies a single time loop for each processor element. To exploit parallelism of the array, the single time loops are scheduled to execute concurrently in the processor elements of the array.

3.2 Summary of Implementation

The process illustrated in FIGS. 1 to 2 is implemented in a collection of program modules that together form a parallel compiler for generating code to run on a synchronous processor array. The compiler system takes a loop nest in a high level programming language such as C and generates a set of synchronous parallel processes for synthesis into a synchronous processor array. The parallel processes are designed to satisfy specified performance and processor constraints. Examples of the performance constraints include the execution time (e.g., schedule length), and the throughput of the processor array. The processor constraints include the number of processors in the array, the topology in which they are connected together, and the available memory bandwidth.

The code generated in the compiler serves as a specification of a synchronous processor array that implements the nested loop. This array consists of nearly identical processor elements. These elements are "nearly identical" in that the boundary processors may be different than interior processors. In some cases, "dead" hardware may be removed from some processor elements (e.g., hardware synthesized from code dependent on a predicate that is always false).

The processor elements are connected in a one or two dimensional grid. The size and dimensionality of this array is referred to as its topology. In general, each processor can be connected to a set of neighboring processors. Preferably, the design system should ensure that the time taken to go from one processor to its neighbor is bounded by an upper bound, which may be one of the parameters that is specified at design time. The processors that can be reached in the specified time are referred to as neighbors.

Each processor element typically contains a certain amount of local storage, which may be organized as registers, register files, or local memories. Similarly, the processor array may have storage local to the array, which is organized as local memory (e.g., RAM). These local memories can be used to reduce the bandwidth between the processor array and global memory.

Each of the processor elements execute nearly the same program. Again, some of the boundary processors may execute code that is slightly different from the code executed by the interior processors.

The processor array is referred to as being synchronous in that each of the processor elements execute their respective parallel processes in lock step. On each cycle, each processor element executes the same instruction, and if one needs to stall, then all do. As a result, any needed synchronization can be guaranteed at the time that the array is designed.

The compiler system is implemented in collection of program modules written in the C++ programming language. While the system may be ported to a variety of computer architectures, the current implementation executes on a PA-RISC workstation or server running under the HP-UX 10.20 operating system. The system and its components and functions are sometimes referred to as being "programmatic." The term "programmatic" refers to a process that is performed by a program implemented in software executed on a computer, in hardwired circuits, or a combination of software and hardware. In the current implementation, the programs as well as the input and output data structures are implemented in software stored on the workstation's memory system. The programs and data structures may be implemented using standard programming languages, and ported to a variety of computer systems having differing processor and memory architectures. In general, these memory architectures are referred to as computer readable media.

Figure 3:
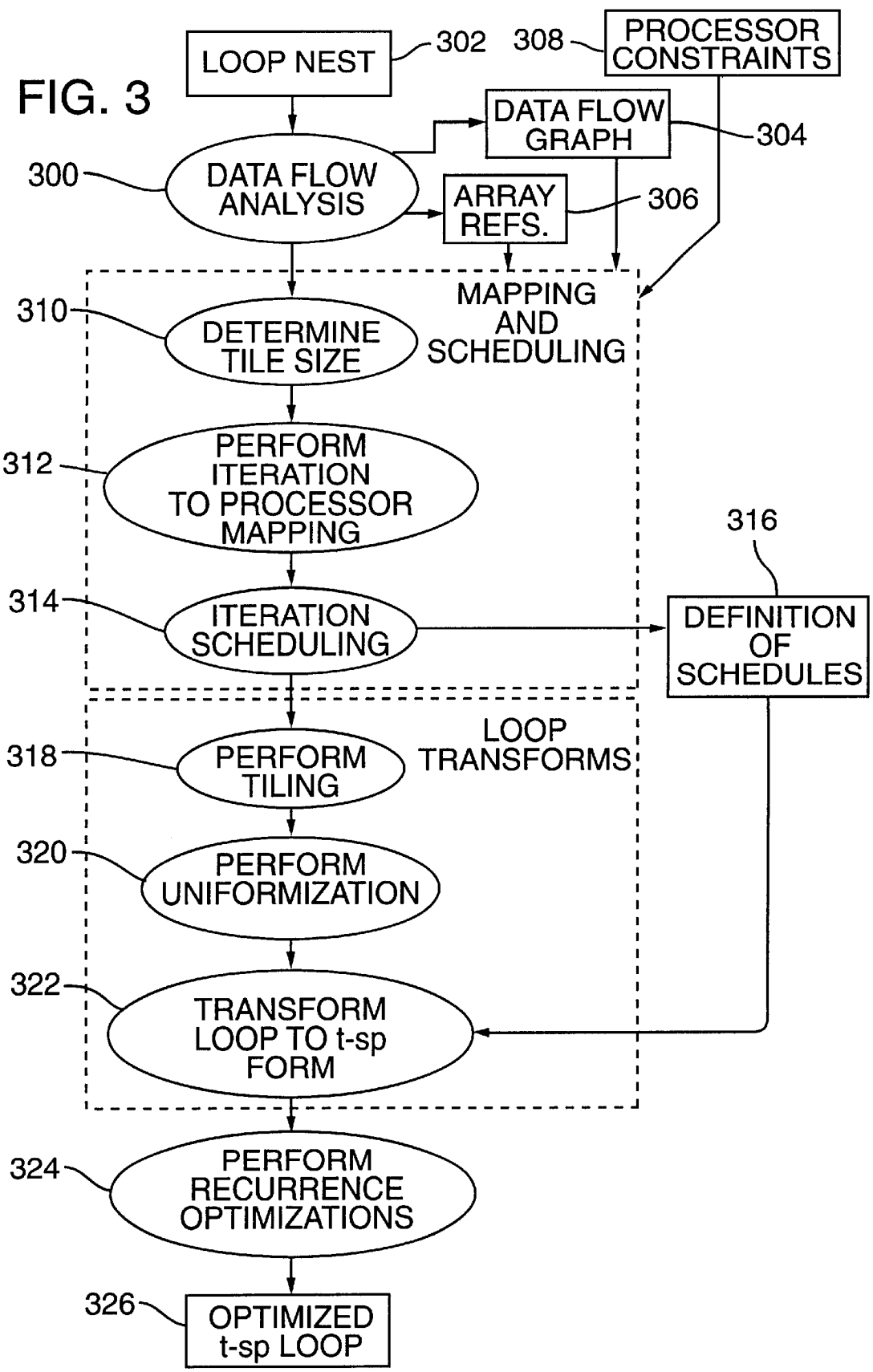
FIG. 3 is a flow diagram of a process for transforming a nested loop into a two-dimensional loop over time and systolic processors.

4.0 Parallel Compiler Components and Methodology FIG. 3 is a flow diagram illustrating an implementation of the parallel compiler. Each of the components in the parallel compiler is described in sub-sections 4.1 to 4.3.

To illustrate the process of transforming a loop nest into a single time loop per processor element, it is helpful to consider a running example. The following sections explain this process using the following loop nest as an example.

int i, j, n1, n2

/* The actual data arrays in memory */ float x[n1], w[n2], y[n1−n2+1];

/* Loop Nest */ for (i=0; i≦n1−n2, i++) { for (j=0; j≦n2; j++} y[i]=y[i]+w[j]*x[i+j];

The above code example is a Finite Impulse Response Filter (FIR). The nested loop has the following characteristics: there is no code, except the statements in the innermost loop body, and there is no procedure call in the inner loop. Exact value flow dependence analysis is feasible for this loop as there are no pointer de-references or non-affine loop indices.

4.1 Data Flow Analysis

The data flow analysis phase (300) takes a high level program (e.g., written in C), including one or more nested loops (302), identifies the nested loop or loops to be transformed into a synchronous processor array, and performs a data dependence analysis on each loop nest. The term "synchronous" in this context means that the processor elements share a common clock. Since the analysis is similar for each loop nest, the remaining discussion assumes a single nested loop.

4.1.1 Creating the Dependence Graph

The data dependence analysis creates a data flow graph (DFG)(304) for the loop nest. This graph is an internal data structure representing the data dependences among operations in the loop body, and dependences between operations in different iterations of the loop body.

Figure 4:
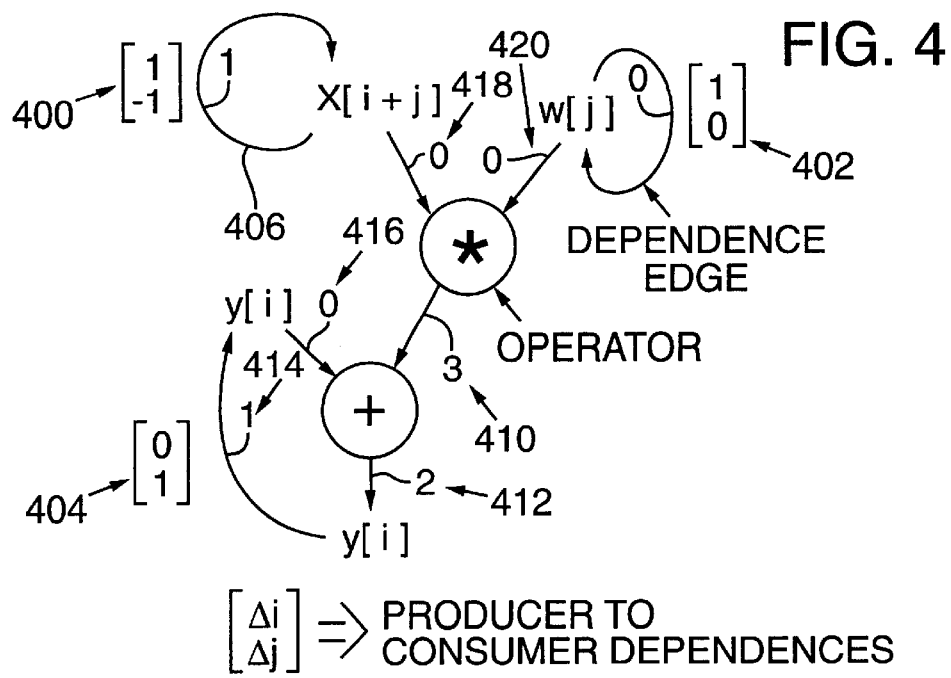
FIG. 4 is an example of a data flow graph for the loop body of a finite impulse response filter, annotated with data dependence information.

FIG. 4 shows an example of the DFG for the example above. The graph records dependences between operations in the loop body. It also records dependences between iterations: read operations consuming input from another iteration, and write operations producing output to another iteration.

The edges of the DFG are annotated with dependence distances and latencies. A dependence distance is an integer vector of size n giving the difference between the iteration indices of an operation that produces a value and the iteration indices of the iteration that uses the value. For data values that are used at many iterations, we introduce a DFG self-loop annotated by the distance between nearby iterations that use the same value (e.g., 406, FIG. 4).

Edges are also annotated with operation latencies as explained in the next section.

4.1.2 Extracting Latency Information

An operation latency refers to the time in cycles between sampling an input of an operation and producing a result available for a subsequent operation. In the implementation, the data flow analysis phase extracts latency information from a database containing a machine description (MDES) that stores latencies for various operations in a given architecture.

The DFG shown in FIG. 4 is annotated with latency information. In this example, the latency of a multiply operation is three cycles (410), and the latency of an add operation is two cycles (412). The latency of these operations is dependent on the particular functional units that will implement them in the processor data path. The data flow analysis phase identifies the operations in the DFG and looks up the corresponding latency of these operations in the MDES section of a macrocell database. As shown in FIG. 4, the data flow analysis phase also assigns a latency to edges in the DFG that represent the latency of communicating an array element from one processor element to another (414–420). This information is added to the data flow graph after mapping iterations to processor elements.

In addition to the data flow graph, another output is a file of array references (FIG. 3, 306) in the loop body. This file contains one record per array indicating how the array is accessed. As explained below, this information is used to estimate the number of array elements read or written by a set of iterations.

Several data flow programs may be used to implement this stage. The current implementation uses a program called Omega from the University of Maryland.

4.2 Preparation of Transformation Parameters

Before the parallel compiler transforms the code, it determines a mapping of iterations to processor elements and an iteration schedule. In general, the iterations in an n-deep loop nest are identified by the corresponding integer n-vector of loop indices in the iteration space. The mapping of iterations to processor elements identifies a corresponding processor element in an (n−1) dimensional grid of processor elements for each of the iterations of the nested loop.

As a practical matter, the iteration mapping will not match the desired topology of a physical processor array. As such, the implementation views the mapping of iterations to an (n−1) dimensional array of processor elements as a mapping to virtual processors. It then assigns virtual processors to physical processor elements.

The parallel compiler determines an iteration mapping and iteration schedule based on processor constraints (308) provided as input. These constraints include the desired performance (e.g., an initiation interval), a memory bandwidth constraint, and a physical processor topology specified as a one or two dimensional processor array.

The implementation uses tiling to reduce local storage requirements of each physical processor element. It also employs clustering to map virtual processors to physical processors. While tiling is not required, it is useful for many practical applications. Tiling constrains the size of the iteration space and thus reduces local storage requirements. However, when the tile size is reduced, the memory bandwidth between local and global memory tends to increase. As the tile size shrinks, there are fewer iterations per tile and the ratio of iterations at the boundary of the tile relative to other iterations in the tile increases. Each local processor, therefore, benefits less from the re-use of intermediate results in the tile.

4.2.1 Determining the Tile Size

The process of tiling partitions the iterations of the nested loop into tiles of iterations that are capable of being initiated and completed sequentially. FIG. 5 shows a conceptual example of tiling a two-dimensional iteration space with iteration coordinates (i,j) into three tiles. In this example, the tiler has partitioned the iteration space (500) into three tiles (502, 504, 506) along the j dimension.

From the example, one can see that the ratio of iterations at the tile boundary to the other iterations in the tile increases when the tile size decreases. Thus, tiling is likely to increase memory bandwidth requirements because of the transfers between main memory and local storage that typically occur at tile boundaries.

The parallel compiler programmatically determines the tile size (310) using the processor constraints (308) and the array references extracted in the data flow analysis. It treats the process of determining a tile size as a constrained minimization problem. It picks a tile shape (i.e., the dimensions of the tile) so that the number of iterations in the tile is minimized while satisfying the constraint of a specified main memory bandwidth. The specified memory bandwidth is provided as input to the parallel compiler as one of the processor constraints. To determine whether a selected tile shape satisfies the bandwidth constraint, the parallel compiler estimates the bandwidth using the following expression:

Estimated bandwidth=(Estimated Traffic/Estimated Cycle Count)

The parallel compiler estimates the traffic (i.e. the estimated transfers to and from main memory) based on the dimensions of the tile and the array references of the iterations in the tile. It estimates cycle count based on the number of iterations in the tile, a specified initiation interval, and the number of processors.

The estimated cycle count is expressed as:

Estimated Cycle Count=(Iterations per tile*initiation interval)/number of processors)

(The units of the initiation interval are processor cycles per iteration. The units of the estimated cycle count are cycles.)

A variety of cost minimization algorithms may be used to solve this constrained minimization problem, such as simulated annealing or hill climbing.

In some cases, the tile size chosen by the tile size routine may cause the iteration scheduling program module process to generate a set of schedules that does not satisfy the dependence constraints of the nested loop. In this case, the parallel compiler expands the tile size and generates a new set of schedules. The selection of the tile size is complete when the set of schedules includes one or more schedules that satisfy the dependence constraints. The form of these constraints is described further below.

4.2.2 Determining an Iteration to Processor Mapping

Next, the parallel compiler determines a mapping of iterations to processor elements (312). As introduced above, the mapping assigns iterations of the nested loop to virtual processors. This mapping produces an (n−1) dimensional grid of virtual processors, each having a set of iterations. The front-end assumes that the mapping is a linear projection of the iterations in the iteration space in a chosen direction called the "null direction." Each virtual processor is assigned a set of iterations that lie along a straight line in the null direction.

Conceptually, the mapping satisfies the following expression:

$$\pi \vec{u} = 0,$$

where $\pi$ is an (n−1) by n matrix and $\vec{u}$ is the null vector.

Figure 6:
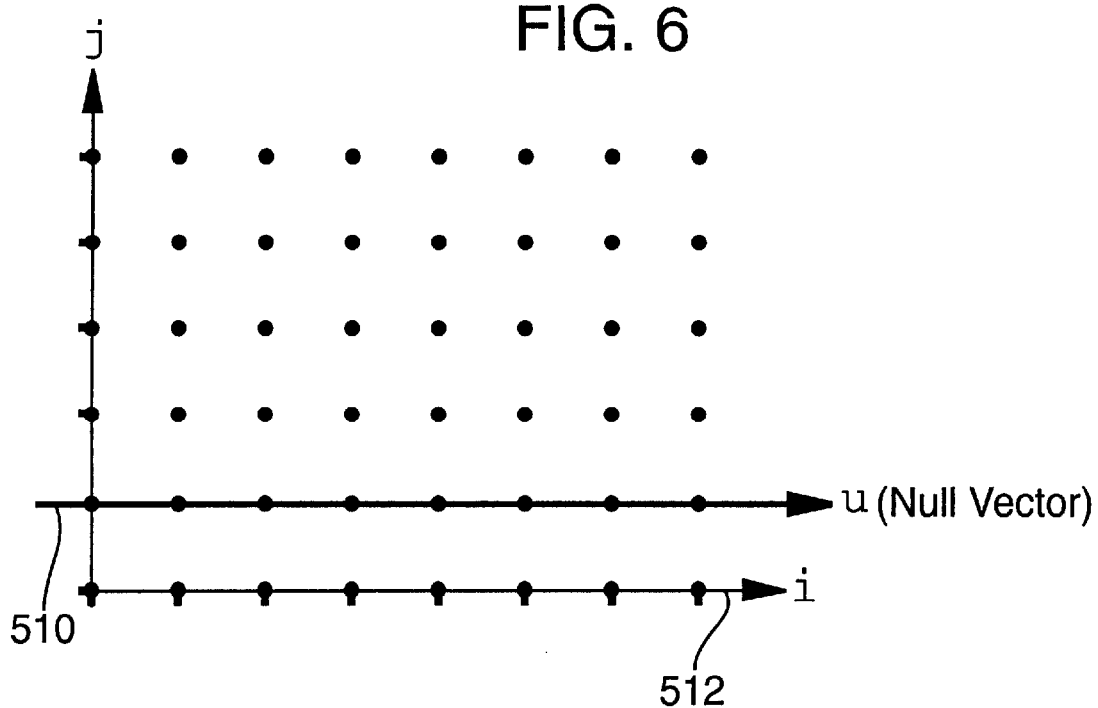
FIG. 6 is diagram illustrating a null vector superimposed on an iteration space. In this example, the null vector is parallel to one of the dimensions of the iteration space.

For a given vector $\vec{u}$, there are infinitely many mappings that satisfy this expression. However, as a practical matter, there are certain choices that are more straight-forward to implement. In the implementation, the null direction is selected to be parallel to one of the iteration coordinates. FIG. 6 illustrates an example where the null vector (510), shown superimposed on the iterations space, is parallel to the i coordinate dimension (512) of a two-dimensional (i,j) iteration space.

Given the null direction parallel to one of the iteration coordinates, the implementation chooses a mapping such that the virtual processors correspond to the remaining (n−1) dimensions in the iteration space. Thus, $\pi$ is chosen to consist of n−1 rows of the identity matrix.

As explained later, it is not necessary to choose a null direction parallel to one of the iteration space coordinates. The iteration scheduling technique described below, for example, applies to other linear mappings of the iteration space in a null direction that is not parallel to one of the iteration space coordinates.

While the implementation obtains a mapping of iterations based on a user-specified null direction, it is also possible to select a null direction and mapping programmatically. The user may provide a null vector and allow the system to select a mapping matrix. Conversely, the user may provide a mapping matrix and allow the system to derive the null direction (the mapping matrix determines the null vector uniquely). Finally, the system may select a null direction and a mapping matrix programmatically.

As noted above, the implementation assigns clusters of virtual processors to physical processor elements. In order to schedule iterations on physical processors, the parallel compiler uses the cluster shape as an input. The user specifies the topology of the physical processor array. The parallel compiler defines the cluster shape as:

$$\vec{C} = \lceil \vec{V}/\vec{P} \rceil$$

where $\vec{C}$ is the cluster shape, $\vec{V}$ is the shape of the virtual processor space, and $\vec{P}$ is the shape of the physical processor array. There are a number of possible choices for associating axes of the virtual processor space with axes of the physical processor space. Section 4.2.3 describes one way to optimize the selection.

4.2.3 Iteration Scheduling

After determining an iteration to processor mapping, the parallel compiler performs iteration scheduling (314) to compute a definition of schedules compatible with the specified processor constraints (308).

Figure 7:
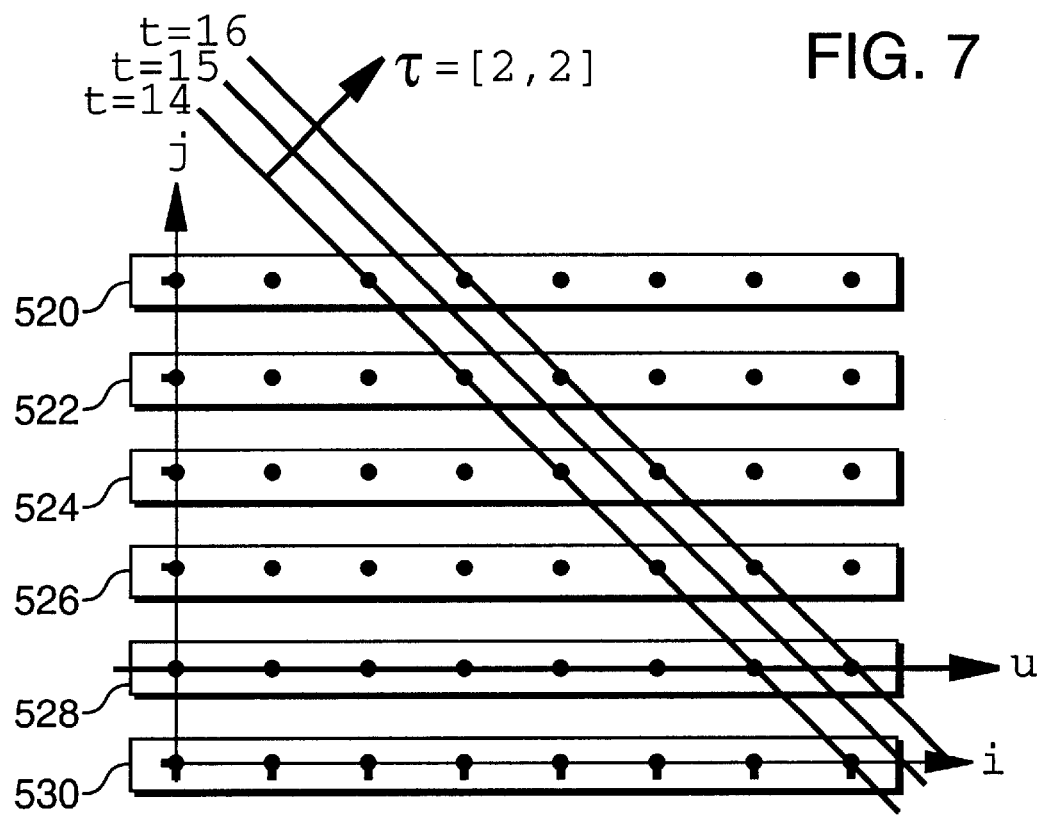
FIG. 7 is a diagram showing an example of scheduling iterations that are mapped to virtual processors. The points in the grid correspond to iterations in the iteration space and the horizontal boxes represent virtual processors.

FIG. 7 illustrates the concept of iteration scheduling of virtual processors. In this phase, an iteration scheduler finds a start time for each iteration to satisfy certain constraints, e.g., the data dependences in the nested loop. In this example, the virtual processors are represented as horizontal boxes (520–530), each containing a set of iterations. The schedule is a vector $\tau$ that defines a start time for each iteration.

Figure 8:
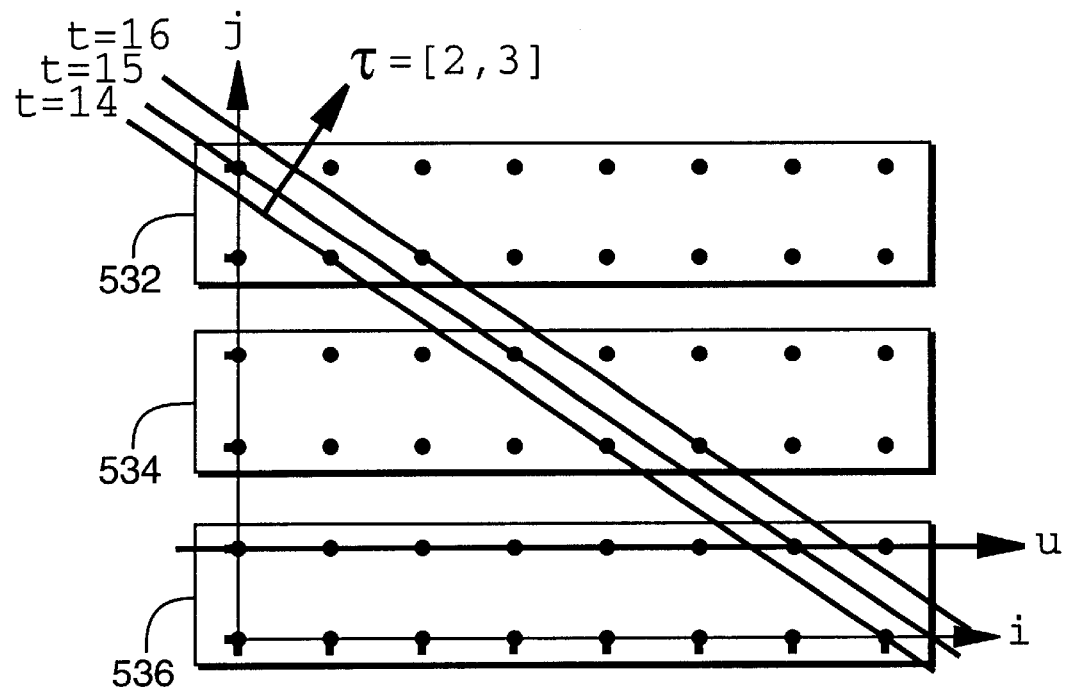
FIG. 8 is a diagram showing an example of scheduling iterations where two virtual processors are assigned to each physical processor element. The horizontal rows correspond to virtual processors, and each of the boxes corresponds to a cluster of virtual processors assigned to a physical processor element.

FIG. 8 alters the example of FIG. 7 by extending it to show iteration scheduling of clustered virtual processors. The horizontal rows correspond to virtual processors, and each of the boxes (532, 534, 536) corresponds to a cluster of virtual processors assigned to a physical processor element. Each start time in the iteration schedule is depicted as a line through the iteration space. The points intersecting each time line are the iterations that begin execution at that time. Due to resource sharing conflicts, it is not possible to schedule two iterations to start at the same time on the same processor. More specifically, the iteration scheduler ensures that only one iteration starts on a processor per initiation interval.

The iteration scheduler in the parallel compiler generates a definition of tight schedules for a given mapping of iterations to processor elements. A tight schedule is one that provides a start time for each iteration on a processor element such that no more than one iteration is started on a processor element for each initiation interval, and after some initial period, exactly one is scheduled for each initiation interval. If the initiation interval is one cycle, for example, then one and only one iteration starts executing on each processor element per cycle.

Given a cluster shape and a mapping of iterations to processor elements in a null direction parallel to one of the iteration coordinates, the iteration scheduler produces a definition of tight schedules:

$$\vec{\tau} = (k_1, k_2 C_1, \ldots, k_n C_1 \ldots C_{n-1}) \quad (1)$$

where $C=(C_1, \ldots, C_{n-1})$ is a vector giving the shape of the cluster of virtual processors assigned to each physical processor and $\vec{k}=(k_1, \ldots, k_{n-1})$ is a vector of integers that has the property that the greatest common divisor of $k_i$ and $C_i$ is one and $k_n = \pm 1$. A preliminary permutation of the axes of the cluster may be applied (e.g., when n=3, $\vec{\tau} = (k_1, k_2 C_1, k_3 C_1 C_2)$ or $\vec{\tau} = (k_1 C_2, k_2, k_3 C_1 C_2)$). As such, schedules where such a preliminary permutation is applied should be deemed equivalent.

The start time of each iteration is the dot product of $\vec{\tau}$ and the iteration coordinates of the iteration:

$$t(\vec{j}) = k_1 j_1 + k_2 C_1 j_2 + k_3 C_1 C_2 j_3 + \ldots + k_n C_l \ldots C_{n-1} j_n$$

where $\vec{j}$ is a vector of loop indices.

The null direction need not be in a direction parallel to one of the iteration space coordinates. The above definition may be used to determine a tight schedule for any linear transformation of the iteration space.

To show this concept, let S be the inverse of a unimodular extension of $\pi$. The last column of S is the null vector $\vec{u}$. The remaining columns are the vectors that describe the virtual processor array. In particular, the first (n–1) rows of $S^{-1}$ are the projection matrix $\pi$. The transformation matrix M is the matrix whose first row is $\vec{\tau}$ and whose last (n–1) rows are $\pi$:

$$M \equiv \begin{pmatrix} \vec{\tau} \\ \Pi \end{pmatrix}; \text{ thus } \begin{pmatrix} t \\ \vec{v} \end{pmatrix} = M \vec{j}$$

is the mapping from iteration $\vec{j}$ to time t and virtual processor $\vec{v}$. We now change basis in the iteration space: $\vec{j}' = S^{-1} \vec{j}$ are the coordinates of the iteration with respect to the basis consisting of the columns of S. In this basis, the transformation becomes:

$$\begin{pmatrix} t \\ \vec{v} \end{pmatrix} = M S \vec{j}' = \begin{pmatrix} \vec{\tau} \cdot S \\ \Pi S \end{pmatrix} \vec{j}' = \begin{pmatrix} \vec{\tau} \cdot S \\ I_{n-1} 0 \end{pmatrix} \vec{j}'$$

Clearly, $\vec{\tau}$ is a tight schedule with cluster shape $\vec{C}$ and mapping $\pi$ if and only it $\vec{\tau} \cdot S$ is a tight schedule for $\vec{C}$ with the mapping $(I_{n-1} 0)$. Hence, the generalized condition (1) applied to $\vec{\tau} \cdot S$ is a necessary and sufficient condition for a tight schedule. The formula does not specify the components of $\vec{\tau}$ but rather the components of $\vec{\tau} \cdot S$ and $\vec{\tau}$ is recovered through the integer matrix $S^{-1}$.

In addition to the constraint that the schedule must be tight, the schedule must also satisfy the dependence constraints. These constraints are expressed as a system of linear inequalities of the form:

$$A \vec{\tau} >= b,$$

where A is a matrix of offsets and b is a vector of time intervals.

An example of the linear inequality constraints for the example of the FIR filter and its annotated DFG graph of FIG. 4 is:

$$A = \begin{bmatrix} 1 & 0 \\ 1 & -1 \\ 0 & 1 \end{bmatrix} \quad b = \begin{bmatrix} 0 \\ 1 \\ 3 \end{bmatrix}$$

The entries of the rows in A come from the sums of the distance vectors on the edges of elementary circuits in the dependence graph. The entries of b are from the latencies of macrocells and from the latencies of interprocessor communication.

The top element of b represents the loop on w, the middle element represents the loop on x, and the third element represents the loop on y. The latency for the loop on w is 0 cycles because the value of this array element is available within the processor element. The latency for the loop on x is 1 because the latency of interprocessor communication between adjacent physical processor elements is assumed to be 1 cycle. Finally, the latency for the loop on y is the sum of the latency for an add operation (2 cycles in the example of FIG. 4) and the latency for interprocessor communication (1 cycle).

The implementation of the iteration scheduler employs linear programming to select values of k for use in formula (1) so that the values of $\vec{\tau}$ are likely to satisfy these linear inequality constraints. Starting with the system of linear inequalities from the data flow analysis, the iteration scheduler computes an upper and lower bound on $\vec{\tau}$. These bounds represent the smallest vector box containing the solutions to $A\vec{\tau}>=b$. Based on the bounds on $\vec{\tau}$ the iteration scheduler computes bounds on the values of k. With these bounds, the iteration scheduler can then select several values of k that fall within the bounds and then exclude all of the selected values where the greatest common denominator with the corresponding value of C is not equal to 1. This approach provides a direct and efficient programmatic method for selecting several iteration schedules that satisfy the desired constraints.

To illustrate iteration scheduling, it is instructive to look at an example.

Figure 9:
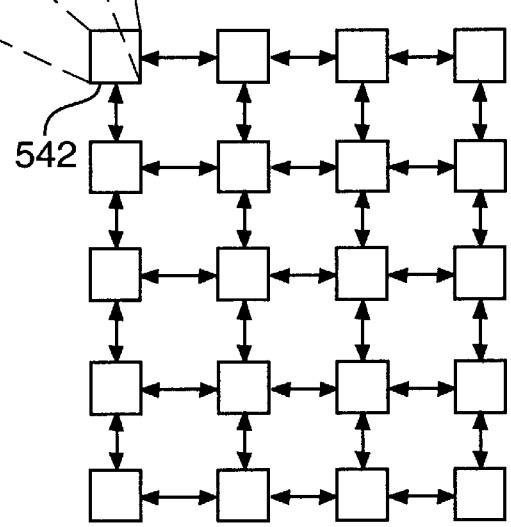
FIG. 9 is an example of an activity table showing start times for an iteration associated with virtual processors in a cluster. Each box in the table corresponds to a virtual processor in a cluster.
Figure 10:
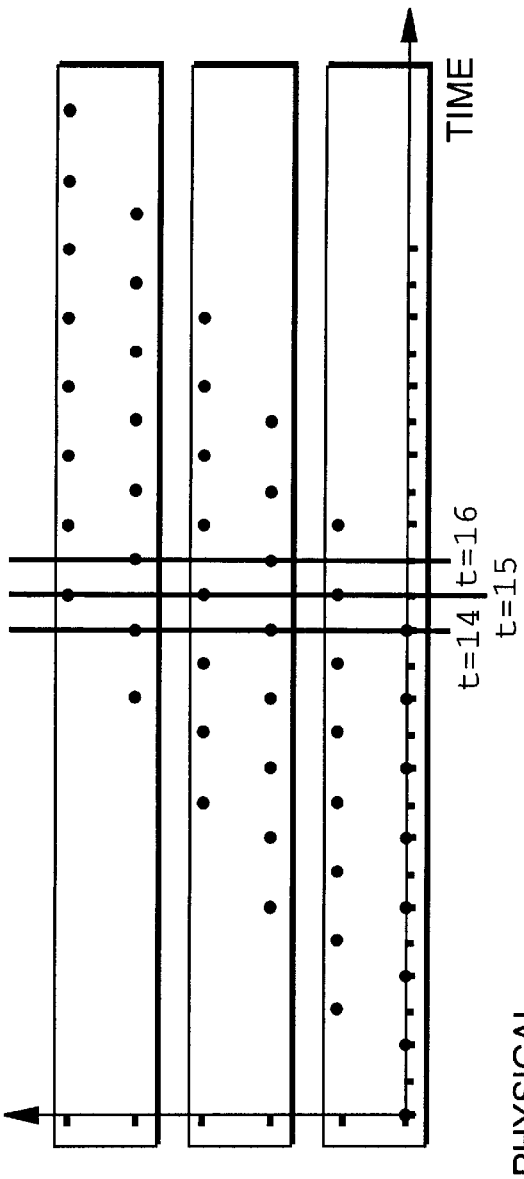
FIG. 10 shows the result of mapping iterations (the points) from an iteration space to a time—virtual processor space. The vertical lines represent a start time for initiating all iterations that lie on the line.
Figure 11:
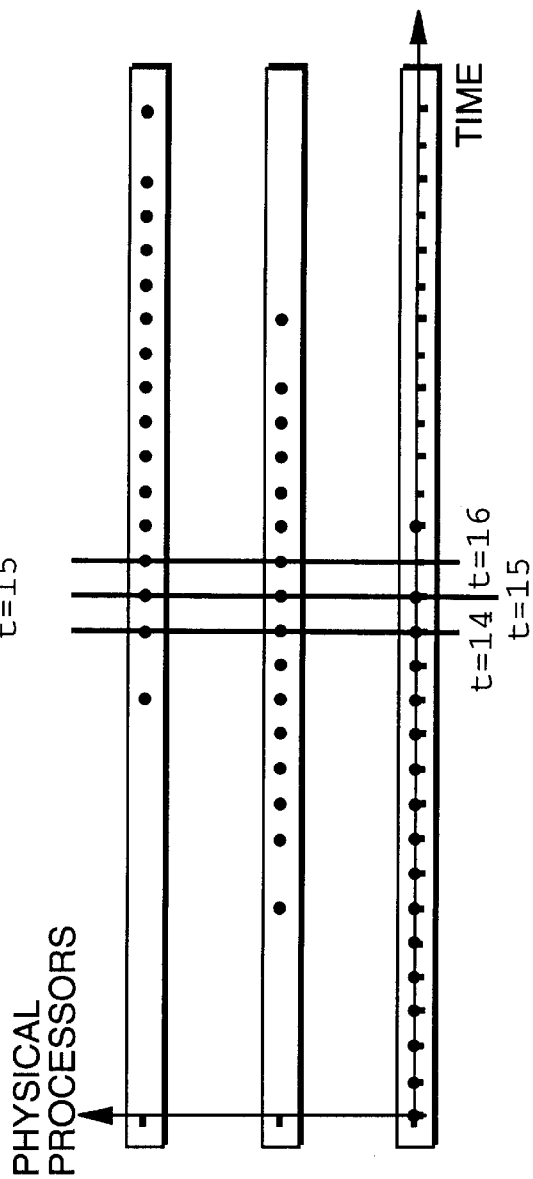
FIG. 11 shows the result of mapping iterations from virtual processor—time space of FIG. 10 to physical processor—time space.

Let n=3; let $\vec{C}$=(4, 5). Assume that u=(0, 0, 1) is the smallest integer null vector of the space mapping. From (1), either $\vec{\tau}$=($k_1$,$4k_2$, ±20) or $\vec{\tau}$=($5k_1$,$4k_2$, ±20) where the greatest common divisor of $k_i$ and $C_1$ for i=1,2. For example, $\vec{\tau}$=(7, 4, 20) is a tight schedule (with $k_1$=7, $k_2$=1, $k_3$=1) that corresponds to the activity table shown in FIG. 9. The example in FIG. 9 shows the activity table for a four by five cluster of virtual processors (540) assigned to a physical processor element (e.g., processor element 542). In this example, the topology of the physical processor array is five horizontal processor elements by four vertical elements. The arrows joining the processors depict interprocessor communication.

The number in each box of the activity table denotes the residue modulo 20 of the times at which the virtual processor in that position within the cluster is active. For a tight schedule, these are all different (the $c_1$ axis is the vertical axis in the diagram).

4.2.4 Optimizing Cluster Topology

As described above, the cluster shape is derived from the mapping of virtual processor axes to physical processor axes. There are typically two or more choices for this mapping that will produce a satisfactory iteration mapping and scheduling. The parallel compiler code may simply pick one of these choices. It can achieve a better result, however, by trying each of the possible choices and picking one that results in the best cost and performance (e.g., shortest total schedule).

4.3 Code Transformation

After determining the iteration mapping and scheduling, the front-end performs a series of loop transformations. These transformations are described in sections 4.3.1 to 4.3.5.

4.3.1 Tiling

The tiling process (318) partitions the iterations in the nested loop based on the tile dimensions computed previously. Tiling transforms the code to a sequential loop over tiles having the form:

```
for (tile)
    for (point in tile) {}
```

Applied to the running example of the FIR filter, tiling yields:

```
/* This loop runs on the host, and loop s over tiles */
for jb=0; jb<n2; jb+=tile_size_2
    /* loop nest, over one tile */
    for (i=0; i≦n1-n2; i++)
        for (jp=0; jp<tile_size_2; jp++) {
            j=jb+jp;
            if (j<n2){
                y[i]=y[i]+w[j]*x[i+j];
            }
        }
```

4.3.2 Uniformization

Uniformization is a method for transforming the code so as to eliminate anti- and output dependences, and to reduce transfers between local and global memory (e.g., load and store operations in a processor element). By eliminating depedences, uniformization increases the amount of parallelism present in the loop nest. It also reduces accesses between local storage and global memory. Preferably, each processor array should propagate a result from a producer operation in one iteration to a consumer operation in another iteration without accesses to global memory, except as necessary at tile boundaries. As part of this code transformation process, the parallel compiler converts arrays in the loop body into uniformized arrays.

To uniformize an array, the parallel compiler uses the dependence data to convert the array indices such that each element of the array is defined at one unique iteration (320). This process is referred to as dynamic single assignment. Uniformized arrays are realized by the back end as registers local to the physical processor elements, while ordinary arrays hold data in global memory (e.g., main memory of the host processor).

Based on the dependency data in the data flow graph, the uniformized arrays for our running example are:

WW [i][j] which holds w [j]
XX [i][j] which holds x[i+j]
YY [i][j] which holds y[i]

from the dependence relation involving x we know that $$xx[i][j]=XX[i-1][j+1]$$

We can use this to define XX[i] [j] whenever (i-1j+1) is a valid iteration, i.e., when i>0 and jp<tile_size_2-1. Otherwise, we need to load data from global memory as shown below:
if (i=0 or jp=tile_size_2-1)

$$XX[i][j]=x[i+j]$$

The uniformized loop nest over one tile in full is

```
for (i=0; i<n1-n2; i++)
    for (jp=0; jp<tile_size_2; jp++){
        j=jb+jp;
        if (jp>0)
            YY[i][jp]=YY [i][jp-1];
        else YY[i][jp]=y[i];
        if (i>0 && jp<tile_size_2-1)
            XX[i][jp]=XX[i-1][jp+1];
        else XX[i][jp]=x[i+j];
        if (i>0)
            WW[i][jp]=WW[i-1][jp];
        else WW[i][jp]=W[j];
        YY[i][jp]=YY[i][jp]+XX[i][jp]*WW[i][jp]
        if (jp==tile_size_2-1)
            y[i]=XX[i][i jp];
    }
```

4.3.4 Loop Transformation

In the next phase of loop transforms, the parallel compiler converts the current form of the loop nest to a time-physical processor space based on the selected iteration schedule (322).

The parallel compiler converts the code to physical processor code using clustering. In this phase, it transforms the code from iteration space to time-physical processor space. The t loop bounds are derived from the schedule and the tile shape; the processor loop bounds are given by the selected processor topology.

References to a uniformized array such as XX[i−1][jp+1] are transformed first into a reference of the form XX[t−δt][$v_1$−δ$v_1$] where δt and δ$v_1$ are given by $$\begin{bmatrix} \delta t \\ \delta v_1 \end{bmatrix} = \begin{bmatrix} \vec{\tau} \\ \Pi \end{bmatrix} \begin{bmatrix} 1 \\ -1 \end{bmatrix}.$$

These being the offset in the time and virtual processor coordinates between the start of iteration (i, jp) and the start of iteration (i−1, jp+1). For example, when $\vec{\tau}$=(2,−3) and π=(0,1), xx[i−1][jp+1] is changed to xx[t−5][$v_1$+1]. Then, this reference is converted to the time, physical processor coordinates using the cluster shape and the cluster coordinate $c_1$. The assignment statement $$XX[t][v_1] = XX[t-5][v_1+1];$$

becomes if C$_1$==1)
XX[t][sp$_1$]=XX[t−5][sp$_1$+1];
else
XX[t][sp$_1$]=XX[t−5][Sp$_1$];
After this phase, the loop nest has the form:
t, p form
  for t=t$_{min}$, t$_{max}$
    for sp$_1$=0 to P$_1$−1 {
      . . .
    }

The outer loop is a loop over time, and the inner loop is a loop over physical processor elements. Each processor element executes the inner time loop in a sequential order in lock step parallel with the others.

4.3.6 Recurrence Optimizations

In a recurrence optimization phase (324), the parallel compiler uses temporal recurrence to transform the loop programmatically from t-sp form to an optimized t-sp form (326).

After transformation to t-sp form, the loop body serves as a specification of each processor element. In an implementation that employs tiling, the loop nest has outer loops over tiles and an inner nest consisting of a sequential loop over time and a parallel nest over processors.

The transformed parallel loop body contains control code that we refer to as "housekeeping code." The housekeeping code includes code for computing various iteration coordinates, code for computing memory addresses, and code for testing loop bounds. Due to its computational complexity and potential memory usage, this code can be quite costly in terms of computation time, memory usage, and memory bandwidth. It is particularly important to reduce these costs to make the synthesized processor array more efficient.

The parallel compiler uses temporal recurrence to implement the housekeeping code. The parallel compiler generates code to compute various iteration coordinates, memory addresses, and loop bound tests locally in a processor element using values computed from a previous iteration. This method of exploiting temporal recurrence is implemented in two forms: 1) code is generated to update certain values from a previous iteration at a selectable time lag behind the current iteration; and 2) code is generated to maintain quantities that repeat periodically in a local storage buffer for later reuse.

The first form is implemented as a decision tree. The local processor element follows a path through the decision tree to one of its leaves. The value of the quantity for the current iteration is obtained by adding a constant to the value of that quantity from a previous iteration. The leaf provides the value of the added constant.

The second form is implemented in a local storage buffer having a depth corresponding to the repeat period of the desired quantity on the processor element. As explained further below, this repeat period is the number of virtual processors assigned to a physical processor element.

These approaches take advantage of the tight iteration schedule. In such a schedule, the physical processor visits each virtual processor assigned to it in a round robin fashion. With each visit, it executes the current iteration assigned to that virtual processor.

In the implementation, the housekeeping code has several forms and functions:

Cluster Coordinates The cluster coordinates, sometimes referred to as "local virtual processor coordinates," give the position of the currently active virtual processor. For a given time on a processor element, the processor element may need to compute the currently active virtual processor.

Global Virtual Processor Coordinates The global virtual processor coordinates give the position of a virtual processor in the time-virtual processor space.

Iteration Space Coordinates The iteration space coordinates are the coordinates of an iteration in the original coordinate space of the nested loop. These coordinates sometimes appear in the transformed code.

Memory Addresses The memory address is the location of an array element whose indices are affine functions of the iteration space coordinates. When data is Live-in or Live-out to the loop nest, it is read in or stored into global memory. In these circumstances, the local processor needs to compute the global memory address for the element.

Boundary Predicates Sometimes referred to as guards, these quantities represent tests of loop boundary conditions. These loop tests include cluster edge predicates, tile edge predicates, and iteration space predicates. Cluster edge predicates indicate whether an iteration is at the boundary of a cluster. Tile edge predicates indicate whether an iteration is at the boundary of a tile. Finally, iteration space coordinates test the coordinates against the limits of the iteration space.

With a tight schedule, the cluster and virtual processor coordinates, and all but one of the global iteration coordinates are periodic with a period equal to the number of virtual processors per cluster. The one global iteration coordinate that is not periodic is the coordinate chosen to be parallel to the null direction. The cluster coordinates are periodic functions. The other coordinates and memory addresses are linear functions of time and the cluster coordinates. Most of the boolean predicate values are defined by linear inequalities in the cluster coordinates, and as such, are also periodic.

One approach for exploiting temporal recurrence is to implement a circular buffer of depth equal to the number of virtual processors in a cluster. This buffer is used to store recurring values. With each iteration, the values in the circular buffer are advanced one position so that the recurring value corresponding to the current iteration is generated. This approach has the drawback of requiring a large buffer when the cluster size is large.

An alternative approach is to update the cluster coordinates $\vec{c}(t,\vec{p})$ from their values at an arbitrary previous cycle but on the same processor: $\vec{c}(t,\vec{p})=R(\vec{c}(t-\delta t,\vec{p}))$ (here R stands for the recurrence map that we now explain.) In this approach, the parallel compiler may select any time lag δt, as long as δt is not so small that the recurrence becomes a tight dataflow cycle inconsistent with the selected iteration schedule. The form of R is straightforward. Using a binary decision tree of depth (n−1), we find at the leaves of the tree the increments $\vec{c}(t,\vec{p})-\vec{c}(t-\delta t,\vec{p})$. The tests at the nodes are comparisons of scalar elements of $\vec{c}(t-\delta t,\vec{p})$ with constants that depend only on $\vec{C}$ and the schedule $\vec{\tau}$. They are thus known at compile time and can be hard coded into the processor hardware.

Many quantities are linearly dependent on time and the cluster coordinates, and thus, may be computed in a similar fashion. The global virtual processor coordinates $\vec{v}$, the global iteration space coordinates $\vec{j}$. and the memory addresses are all linear functions of them. Once the parallel compiler selects the change in δt and the change in $\vec{c}$ then it can programmatically generate code to compute the changes in all of these derived values, and these changes appear as explicit constants in the generated code. Only one addition is needed to compute each such value. This approach reduces the problem of cost reduction to that of the update of the cluster coordinates.

Next, we describe how to generate this decision tree programmatically. It is possible to construct the decision tree without resorting to construction and exploration of the activity table. Since $\vec{\tau}$ is tight, we know that (up to permutation of the indices, and with the proviso that π consists of the first (n−1) rows of the identity:

$$\vec{\tau}=(k_1,k_2C_1,\ldots,k_{n-1}C_1\ldots C_{n-2},\pm\gamma) \quad (2)$$

where t he greatest common divisor $(k_i,C_i)=1$ for all $1\leq i\leq n-1$ and $\gamma=C_1\ldots C_{n-1}$.

We consider the set C of cluster coordinate s within a cluster of virtual processors, i.e. within one physical processor:

$$C=\{\vec{c}\in Z^{n-1}|0\leq c_k<C_i, k=1,\ldots,(n-1)\}$$

For every position $\vec{c}\in C$, we associate a local clock at which the given virtual processor is active $$t_c(\vec{c})\equiv\tau_1 c_1+\ldots+\tau_{n-1}c_{n-1}(\bmod \gamma)$$

$t_c$ maps C one-to-one onto $[0..(\gamma-1)]$. Let δt be a given time lag. We wish to know the set B of all of the differences of positions (members of C—C, the set of differences of cluster coordinate vectors) that can occur as values of $t_c^{-1}(t+\delta t)-t_c^{-1}(t)$. For convenience, we use $\vec{\tau}$ for its first (n−1) components wherever convenient. By definition, B consists of the position-difference vectors $\vec{x}$ that satisfy $\vec{\tau}\cdot\vec{x}\equiv\delta t$ (mod γ). By (2), we have $$k_1 x_1+k_2 C_1 x_2+\ldots+k_i x\ldots x\ C_{n-2}x_{n-1}\equiv\delta t(\bmod\gamma) \quad (3)$$

Now divide δt by $C_1$: then $\delta t=q_1 C_1+r_1$ where $0\leq r_1<C_1$. By (3), we have that $k_1 x_1\equiv r_1$ mod $C_1$, so that $x_1\equiv k_1^{-1} r_1$ mod $C_1$, (recall that $k_1$ and $C_1$ are relatively prime, so that $k_1$ has an inverse in the additive group of the integers modulo $C_1$).

Because x ∈B has elements bounded in absolute value by the elements of C, it follows that there are only two possible values for $x_1$:

$$x_1 \in \{k_1^{-1}r_1 \bmod C_1, (k_1^{-1} \bmod C_1)-C_1\}$$

These are the two possible differences of the first coordinate of $\vec{c}(t+\delta t)$ and $c(\vec{t})$. The choice is made on the simple basis of which leads to a new point in the activity table. Only one can. So $$c_1(t+\delta t)=c_1(t)+\begin{cases} k_1^{-1}r_1 \bmod C_1 & \text{if } (c_1(t)+k_1^{-1}r_1 \bmod C_1)<C_1 \\ k_1^{-1}(r_1 \bmod C_1)-C_1 & \text{otherwise} \end{cases}$$

Pursuing this line of argument, for each choice of change in first coordinate, $x_1$, we determine the two possible choices for the change in the second coordinate, $x_2$. From (3) we have that $k_2 C_1 x_2+\ldots+k_{n-1}C_1 x\ldots x C_{n-2}x_{n-1}\equiv(\delta t-k_1 x_1)$ (modγ). We already know that $\delta y-k_1 x_1$ is a multiple of $C_1$. Thus, we have that $$k_2 x_2 \equiv ((\delta t-k_1 x_1)/C_1)(\bmod C_2)$$

Thus, as before, we conclude that $$x_2 \in \{k_2^{-1}((\delta t-k_1 x_1)/C_1)\bmod C_2, (k_2^{-1}((\delta t-k_1 x_1)/C_1)\bmod C_2)-C_2\}$$

Continuing in this way, we arrive at the tree of changes of cluster coordinates.

To illustrate this approach, consider the example shown in FIG. 9.,

Take δt=1

$\vec{C}=(4,5)$ and $\vec{\tau}=(7,4,20)=(k_1,k_2 C_1\tau)$ where $k_1=7$ and $k_2=1$ thus, $r_1=1, k_1^{-1}r_1 \bmod C_1=7^{-1} \bmod 4=3$, and $$C_1(t+1)=C_1(t)+\begin{cases} 3 & \text{if } C_1(t)+3\leq 3 \\ -1 & \text{otherwise} \end{cases}$$

Now consider the decision tree branch for $C_1(t)=0$, in which $x_1=C_1(t+1)-C_1(t)=3$. Then $$k_2 x_2 = x_2 \equiv ((\delta t-k_1 x_1)/C_1) \bmod C_2$$
$$= ((1-7\cdot 3)/4) \bmod 5$$
$$= -5 \bmod 5$$
$$= 0$$

which is precisely the correct change to $c_2$ for the times at which $c_1$ changes from 0 to 3.

The decision tree for this example is:
```
if (c(1)==0){
    c(1)+=3;
    c(2)+=0;
}else{
    c(1)+=(-1);
    if (c(2)<3){
        c(2)+=2;
    }else{
        c(2)+=(-3);
    }
}
```

The decision tree approach can also be explained from a matrix-oriented and geometric viewpoint that has the additional advantage of simplifying the computation of the different changes in coordinates.

$H_m$ is the Hermite National Form of M. T is the basis of $Z^n$ such that $MT=H_m$; the first row of MT gives the time difference along each column vector of T, and the last rows are the coordinates of the column vectors of T in the virtual processor array. Since the first row of MT is $(1, 0, \ldots, 0)$, the first column $\vec{w}$ of T connects an isochrone to the next isochrone, and the remaining columns $\vec{t}_2, \ldots, \vec{t}_n$ lie in an isochrone. An isochrone is a set of iterations scheduled to start at time t. In geometric terms, it is an (n−1) dimensional plane that contains all iterations that start at a given time.

Given the iteration $\vec{j}$, what we want to find is a vector $\vec{k}$ such that $M(\vec{j}+\vec{k})=(t+\delta t, \vec{z})_t$ where $\vec{z}$ is in the activity table. We know already that $\vec{k}$ exists and is unique since the schedule starts one iteration per initiation interval on each processor. This can also be seen from the fact that $H_m$ has the $C_i$'s on the diagonal: writing $\vec{k}=T\vec{\lambda}$, we end up with a triangular system that can be easily solved thanks to the structure of $H_m$. We can add a suitable linear combination of $\vec{t}_2, \ldots, \vec{t}_n$ to $\delta t \times \vec{w}$ (the first component of $M(\delta t \times \vec{w})$ does not change) so that the (n−1) last components of $M(\delta t \times \vec{w})$ are in the activity table. This vector (let us denote it by $\vec{\delta}[0, \ldots, 0]$) will be one of the candidates in the decision tree. Now, either the second component of $M(\vec{j}+\vec{\delta}[0, \ldots, 0])$ is still strictly less than $C_1$, then we are in the first case (first branch of the tree), or this component is strictly less than $2C_1$ and we simply subtract $\vec{t}_2$ to go back in the activity table: $\vec{\delta}[0, \ldots, 0]=\vec{\delta}[0, \ldots, 0]-\vec{t}_2$ (plus possibly a linear combination of $\vec{t}_3, \ldots, \vec{t}_n$ so that the (n−2) last components of $M\vec{\delta}[1,0,\ldots,0]$ are in the activity table), is one of the candidates in the decision tree. Continuing in this way, we end up with at most $2^{(n-1)}$ vectors (at most two cases for each dimension, and only one when the corresponding component of the move vector is zero).

The notation in brackets for the vectors $\vec{\delta}$ specifies if the move is nonnegative (0) or negative (1): for example, $\vec{\delta}[0,1,1]$ corresponds to the case where we move forward in the first dimension, and backward in the two other dimensions.

We illustrate this technique on the example shown in FIG. 9 and discussed in Section 4.2.2.

The Hermite Form of the mapping $(MT=H_m)$ is:

$$\begin{pmatrix} 7 & 4 & 20 \\ 1 & 0 & 0 \\ 0 & 1 & 0 \end{pmatrix} \begin{pmatrix} 3 & 4 & 0 \\ 0 & 3 & 5 \\ -1 & -2 & -1 \end{pmatrix} = \begin{pmatrix} 1 & 0 & 0 \\ 3 & 4 & 0 \\ 0 & 3 & 5 \end{pmatrix}$$

We take $\delta t=1$ from the matrix $H_m$, we read that we may have to move along $\vec{w}=(3,0)$ in the virtual space (which corresponds to the vector $\vec{\delta}[0,0]=(3,0-1)$ in the original space). If $c_1+'4$, then we subtract the second column of $H_m$, i.e. (4, 3), we find the move vector $(-1,-3)$, and we add the third column to go back in the box: $(3, 0)-(4, 3)+(0, 5)=(-1, 2)$. This corresponds in the original space to $\vec{\delta}[1, 0]=(3, 0,-1)-(4, 3,-2)+(0, 5,-1)=(-1, 2, 0)$. Then, for both vectors, we check the last component: in the first case, no other vector is required since the second component of (3, 0) is 0. In the second case, we may have to subtract (0, 5): the last candidate is thus $(-1, 2)-(0, 5)=(-1, -3)$ and $\vec{\delta}[1,1]=(-1,3,1)$.

The decision tree for this example is the same as the one provided above.

Figure 12:
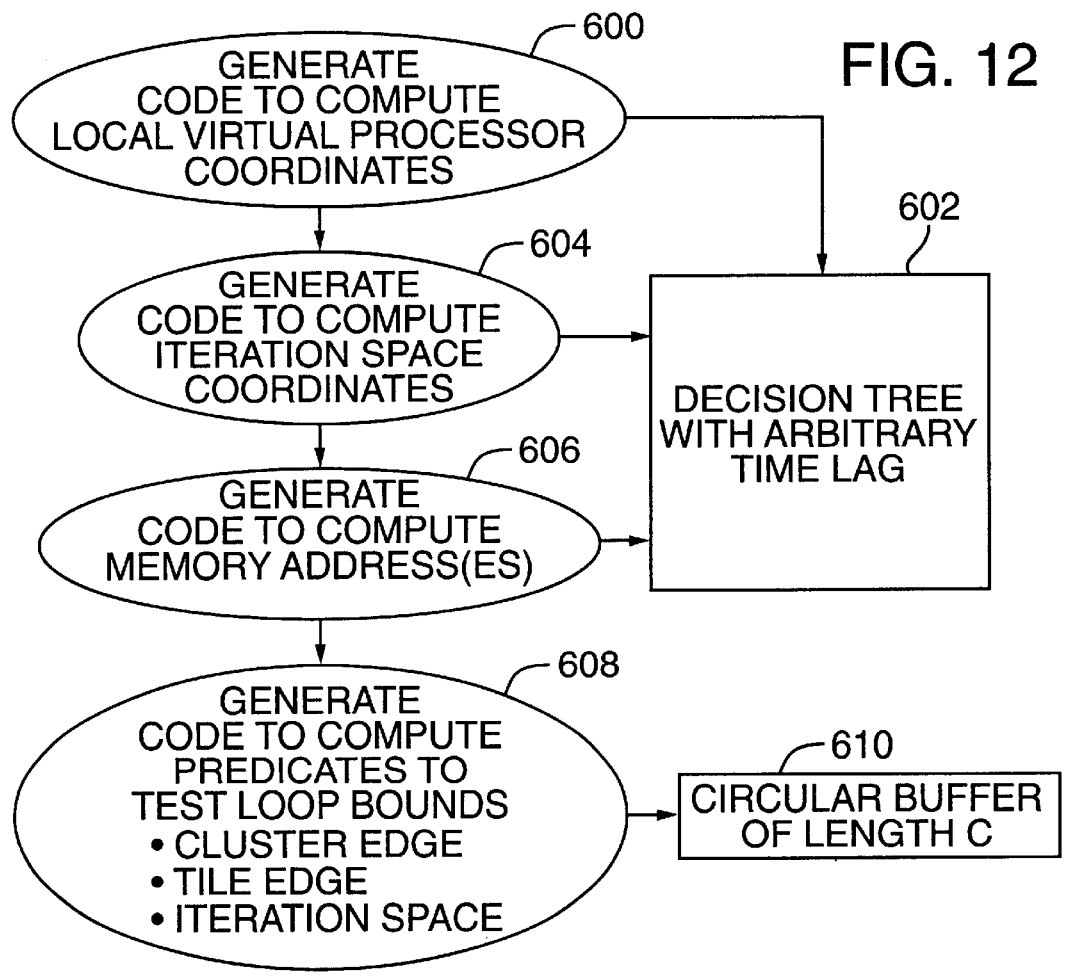
FIG. 12 shows a method for generating housekeeping code to compute iteration coordinates, memory addresses, and predicates efficiently using temporal recursion.

FIG. 12 is a flow diagram summarizing how the parallel compiler generates housekeeping code that exploits temporal recurrence.

The parallel compiler begins by generating the code of the decision tree for the local virtual processor coordinates and the mapped out coordinate (600). As illustrated in the example above, the generated code at the leaves of the decision tree specify the value of each local virtual processor coordinate as a function of the virtual processor coordinate at a selected prior time plus a constant. The time lag is arbitrary, yet must be large enough so that the result of the calculation of the coordinate at the prior time is available to compute the coordinate in the current iteration. An example of the code generated at this point is:

```
if (c1[t-2]<2)
   c1[t]=c1[t-2]+3
   if (c2<4)
      c2[t]=c2[t-2]+3
      k[t]=k[t-2]+4
   else
      c2[t]=c2[t-2]-4
      k[t]=k[t-2]+6
else
   c1[t]=c1[t-2]-2
   c2[t]=c2[t-2]
   k[t]=k[t-2]+7
```

In the implementation, the global iteration coordinates correspond to the global virtual processor coordinates, except for the global iteration coordinate in the mapping direction (this is the mapped out coordinate). As such, the global iteration coordinates, except for the mapped out coordinate, are computed similarly as the global virtual processor coordinates.

The parallel compiler proceeds to generate code to compute other quantities that are linearly dependent on the local virtual processor coordinates. As it does so, it augments the decision tree code (602) with program statements that express these quantities in terms of their values at a selected previous time on the same processor element plus a constant.

The global virtual processor coordinates for the current iteration are equal to the local virtual processor coordinates plus a constant. As such, the change in the local virtual processor coordinate between the current and selected previous time is the same as the change in the global virtual processor coordinate. Furthermore, the remaining global iteration space coordinates are identical to the global virtual processor coordinates. The parallel compiler generates the program statements to compute the remaining global iteration coordinates for the current iteration in the same way as the corresponding local virtual processor coordinates (604).

Continuing the example, the decision tree code now looks like:

```
if (c1[t-2]<2)
   c1[t]=c1[t-2]+3
   i[t]=i[t-2]+3
   if (c2<4)
      c2[t]=c2[t-2]+3
      j[t]=j[t-2]+3
      k[t]=k[t-2]+4
   else
```

```
        c2[t]=c2[t-2]-4
        j[t]=j[t-2]-4
        k[t]=k[t-2]+6
    else
        c1[t]=c1[t-2]-2
        c2[t]=c2[t-2]
        i[t]=i[t-2]-2
        j[t]=j[t-2]
        k[t]=k[t-2]+7
```

Next, the parallel compiler generates the code to compute memory addresses of array elements in the loop body (606). Based on the linear mapping of iterations to physical processors, the memory address of an array element, e.g., a[i+j−3*k+2] has the form addr_of_element =Ci * i+Cj*j+ Ck*k+CO. At this point, the parallel compiler has computed the constants CO, Ci, Cj, and Ck. Thus, it can now compute a change in a memory address from the changes in i, j, and k. The resulting decision tree code looks like:

```
    if (c1[t-2]<2)
        c1[t]=c1[t-2]+3
        i[t]=i[t-2]+3
        if (c2<4)
            c2[t]=c2[t-2]+3
            j[t]=j[t-2]+3
            k[t]=k[t-2]+4
            addr_of_element[t]=addr_of_element[t-2]+
                Ci*3+Cj*3+Ck*4
        else
            c2[t]=c2[t-2]-4
            j[t]=j[t-2]-4
            k[t]=k[t-2]+6
            addr_of_element[t]=addr_of_element[t-2]+Ci*3+
                Cj*(-4)+Ck*6
    else
        c1[t]=c1[t-2]-2
        c2[t]=c2[t-2]
        i[t]=i[t-2]-2
        j[t]=j[t-2]
        k[t]=k[t-2]+7
        addr_of_element[t]=addr_of_element[t-2]+Ci*(-
            2)+Cj*(0)+Ck*7
```

The constant expressions can be evaluated and simplified to a single constant at compile time or during initialization in the host processor.

The local storage for the decision tree approach can be implemented efficiently using a FIFO buffer of depth equal to the selected time lag. Initial values for the FIFO buffer may be computed and stored in local or global storage at compile time or during initialization in the host processor.

Next, the parallel compiler generates the code to compute boundary predicates (608). Most predicates, except those dependent on the mapped out coordinate, are periodic with a period equal to the cluster size. Iteration space predicates test whether an iteration is within the bounds of the iteration space. They are periodic, except for those dependent on the mapped out coordinate.

The tile edge predicate is used for load/store control, and in particular, to propagate read-only arrays. These predicates are periodic unless dependent on the mapped out coordinate.

Cluster edge predicates indicate whether an iteration is at a cluster boundary, and as such, indicate whether to select local or remote data reference.

The local storage for the circular buffer approach can be implemented efficiently using a circular buffer of depth equal to the size of the cluster. Values for the circular buffer may be computed and stored in local or global storage at compile time or during initialization in the host processor.

4.3.6 Assembly Code Generation

Assembly code generation is an implementation specific process for transforming the optimized loop nest code from the form used in the parallel compiler to the form used in the synthesis of the processor array.

The parallel compiler uses a machine-independent representation for programs that is well suited for loop transformations and other high level parallelizing transformations. In particular, the parallel compiler employs routines and the machine independent representation of the SUIF compiler, a publicly available compiler from Stanford University.

The synthesis process takes a machine dependent control flow graph (CFG) representation of the program as input. The specific representation used in the implementation is publicly available as part of the TRIMARAN software available from New York University.

In the process of converting to machine dependent CFG form, this phase translates the high level representation to operations for a parameterized family of processors, called HPL-PD, which is described in Vinod Kathail, Michael Schlansker, B. Ramakrishna Rau. HPL PlayDoh Architecture Specification: Version 1.0. Technical Report HPL-93-80. Hewlett-Packard Laboratories, February, 1 994.

This phase produces two files: one contains the machine dependent CFG in textual form, and the other is the annotation file.

The annotations file provides a mapping of uniformized arrays to expanded virtual registers (EVRs) along with data dependences expressed as time/space distances for each variable reference. These dependences identify inter-processor data communication within the processor array. The annotation file also specifies global variables that remain as global variables in the transformed loop nest. In addition, the annotation file specifies the mapping of non-uniformized, non-global variables to local storage elements (e.g., EVRs, and static registers).

The synchronous processor array is a co-processor of a host VLIW processor. The nested loop is part of a larger program executed on the host. To execute the loop nest, the host VLIW communicates commands and data to the synchronous processor array through an interface. In the interface with the processor array, the host VLIW processor views live-in and live-out variables as residing in its local memory. The annotation file identifies live-in/live out variables and assigns memory address in the host processor's local memory space to them. In the current implementation, a code translator transforms the optimized code from the parallel compiler to the code format used in the synthesis process and generates the annotation file. The parallel compiler uses a predefined naming convention for identifying uniformized arrays, static variables, and non-uniformized/non-global variables. These naming conventions allow the translator to identify the variable types and generate the entries in the annotation file.

The data flow analysis phase of the front end identifies the live-in, live out variables. These are the variables that the host processor initializes before the processor array executes the loop nest (the live-in variables), and the variables that host processor may query when the processor array has completed execution of the loop nest (the live-out variables).

The information either from the source program or from front end computations is kept in the internal representation. At the time of assembly code generation, the information is written out to a file in a simple text format.

5.0 Conclusion

Although the preceding sections describe specific implementations of a parallel compiler, the invention is not limited to these implementations. Components of the system may be used in various combinations for different computer architectures and hardware design scenarios. In addition, the methods apply to a variety of parallel processor architectures and are not limited to synchronous processor arrays or co-processors that operate in conjunction with a host processor.

The parallel compiler methods for transforming a sequential nested loop into a parallel program, for example, apply to a variety of parallel computing architectures, including both synchronous and asynchronous processor systems. For asynchronous processor systems, such as network of computers, the iteration scheduling techniques described above may still be applied. However, explicit synchronization code may be added whenever synchronization is needed to guarantee that the correct data is referenced. While it is particularly advantageous to generate a parallel program for synthesis into an application specific design, it is also possible to use the parallel compiler techniques for an existing or given multi-processor architecture.

Some implementations may omit or use alternatives to the processes used in the implementation of the parallel compiler. For example, developers of alternative implementations may choose to omit tiling, may use alternative scheduling methodologies, may omit or use alternative loop transformations and control code schemes and their optimizations.

The methods and system components may be used to design multiple processor arrays. In some applications, for example, the input program may include several loop nests. These loop nests may be extracted, transformed to parallel processes, and synthesized into distinct processor arrays or cast onto a single multi-function processor array.

The methodology and system design described enables the use of parallel compiler and ILP compiler technology to optimize the parallel code and the hardware synthesized from this parallel code. Examples of the parallel compiler technologies include tiling, uniformization or privatization, iteration mapping, clustering, uni-modular loop transformation and non-unimodular loop transformation.

In view of the many possible implementations of the invention, it should be recognized that the implementation described above is only an example of the invention and should not be taken as a limitation on the scope of the invention. Rather, the scope of the invention is defined by the following claims. We therefore claim as our invention all that comes within the scope and spirit of these claims.

We claim:

1. A method for determining an iteration schedule for iterations of a nested loop to be executed on an array of processor elements, the method comprising:

determining a mapping of iterations of the nested loop to processor elements; and from the mapping and a specified initiation interval, programmatically determining a definition of iteration schedules of the form:

$T(I) = (t1\ i1 + t2\ i2 + \ldots + tn\ in)$, where I is a vector of loop indices (i1, i2, ... in) whose elements identify an iteration of the loop, T(I) is the start time of iteration I, and $t=(t1, \ldots, tn)$ is a schedule vector;

wherein said determining the definition of schedules comprises obtaining a representation of data dependence constraints expressed as a system of linear inequalities to be satisfied by the schedule vector t; finding upper and lower bounds on elements of the vector t based on the data dependence constraints; and using the bounds as a constraint on the schedule vector t.

2. The method according to claim 1 further comprising:

determining whether the schedules satisfy the data dependence constraints; and when at least one of the schedules satisfies the dependence constraints, producing a set of one or more schedules that satisfy the data dependence constraints.

3. The method according to claim 2, further comprising selecting a schedule from among the set of one or more schedules that satisfy the data dependence constraints according to cost or performance criterion.

4. A method for determining an iteration schedule for iterations of a nested loop to be executed on an array of processor elements, the method comprising:

determining a mapping of iterations of the nested loop to processor elements;

from the mapping and a specified initiation interval, programmatically determining a definition of iteration schedules, where each schedule provides start times for initiating execution of iterations on a processor element such that no more than one iteration is started on a processor element for each initiation interval, wherein the processor elements are physical processor elements, and said determining a definition of iteration schedules including:

assigning the iterations of the nested loop to a virtual processor space, where virtual processors in the virtual processor space each have a corresponding one-dimensional sub-set of iterations in an iteration space; and assigning virtual processors to processor elements such that a rectangular cluster of virtual processors is assigned to each physical processor element;

wherein the definition of schedules is defined as:

$T(I) = (t1\ i1 + t2\ i2 + \ldots + tn\ in);$ and $t = (k1,\ k2C1, k3C1C2, \ldots,\ knC1^{***}Cn-1),$ where I is a vector of loop indices whose elements identify an iteration of the loop, T(I) is the start time of iteration I, $C = (C1, \ldots\ Cn-1)$ is a vector defining a rectangular subset of the virtual processors that includes the virtual processors mapped to any one physical processor, and $k = (k1, \ldots, kn)$ is a vector of integers that has the property that the greatest common devisor of ki and Ci is one and kn = +1 or −1.

5. The method according to claim 4, wherein said determining the definition of schedules further comprises obtaining a representation of data dependence constraints expressed as a system of linear inequalities to be satisfied by the schedule vector t; finding upper and lower bounds on elements of the vector t based on the data dependence constraints; and using the bounds as a constraint on the schedule vector t.

6. The method according to claim 5, further comprising.

determining whether the schedules satisfy the data dependence constraints; and when at least one of the schedules satisfies the dependence constraints, producing a set of one or more schedules that satisfy the data dependence constraints.

7. The method according to claim 4, further comprising selecting an iteration schedule from among a plurality of the schedules according to cost or performance criterion.

8. A method for determining an iteration schedule for iterations of a nested loop to be executed on an array of processor elements, the method comprising:

performing tiling of iteration space of the nested loop to partition the iteration space into tiles of iterations to be initiated sequentially;

determining a mapping of the iterations of the nested loop to processor elements based on the tiles; and from the mapping and a specified initiation interval, programmatically determining a definition of iteration schedules and, when a set of schedules does not satisfy data dependence constraints of the nested loop, further comprising expanding size of the tiles and determining new sets of schedules, said expanding and determining new set being performed until at least one new set of schedules satisfies the data dependence constraints.

9. The method according to claim 8, wherein each schedule provides start times for initiating execution of the iterations on a processor element such that no more than one iteration is started on a processor element for each initiation interval.

10. The method according to claim 9, further comprising selecting an iteration schedule from among a plurality of the new schedules according to cost or performance criterion.

11. The method according to claim 8, wherein said determining the definition of schedules comprises obtaining a representation of the data dependence constraints expressed as a system of linear inequalities to be satisfied by a schedule vector t; finding upper and lower bounds on elements of the vector t based on the data dependence constraints; and using the bounds as a constraint on the schedule vector t.

12. The method according to claim 8, wherein the definition of schedules is defined as:

$$T(I) = (t1\ i1 + t2\ i2 + \ldots + tn\ in);$$

and $$t = (k1, k2C1, k3C1C2, \ldots, knC1^{***}Cn-1),$$

where I is a vector of loop indices whose elements identify an iteration of the loop, T(I) is the start time of iteration I, C=(C1, ..., Cn-1) is a vector defining a rectangular subset of the virtual processors that includes the virtual processors mapped to any one physical processor, and k=(k1, ..., kn) is a vector of integers that has the property that the greatest common devisor of ki and Ci is one and kn=+1 or −1.

13. The method according to claim 8, wherein performing tiling comprises choosing an initial tile shape such that the number of iterations in a tile are minimized while memory bandwidth associated with a selected tile size is less than a specified memory bandwidth constraint.

14. The method according to claim 13, wherein the memory bandwidth is an estimate of memory bandwidth computed as:

(estimated traffic)/(estimated cycle count);

where estimated traffic represents an estimate of transfers to and from local memory of a processor element and is estimated based on tile dimensions and array references with the iterations of the tile, and estimated cycle count is estimated based on the number of iterations in a tile and a specified initiation interval for each iteration.

15. A method of generating a conflict-free schedule of iterations mapped to processors by projecting iterations along a null direction to form virtual processors, grouping the virtual processors into rectangular clusters, assigning the rectangular clusters to physical processors and determining a definition of schedules defined as:

$$T(I) = (t1\ i1 + t2\ i2 + \ldots + tn\ in);$$

and $$t = (k1, k2C1, k3C1C2, \ldots, knC1^{***}Cn-1),$$

where I is a vector of loop indices whose elements identify an iteration of the loop, T(I) is the start time of iteration I, C=(C1, ..., Cn-1) is a vector defining a rectangular subset of the virtual processors that includes the virtual processors mapped to any one physical processor, and k=(k1, ..., kn) is a vector of integers that has the property that the greatest common devisor of ki and Ci is one and kn=+1 or −1.

16. The method according to claim 15, wherein said determining the definition of schedules further comprises obtaining a representation of data dependence constraints expressed as a system of linear inequalities to be satisfied by the schedule vector t; finding upper and lower bounds on elements of the vector t based on the data dependence constraints; and using the bounds as a constraint on the schedule vector t.

17. The method according to claim 16, further comprising:

determining whether the schedules satisfy the data dependence constraints; and when at least one of the schedules satisfies the dependence constraints, producing a set of one or more schedules that satisfy the data dependence constraints.

18. The method according to claim 15, further comprising selecting an iteration schedule from among a plurality of the schedules according to cost or performance criterion.

* * * * *